(12) United States Patent
Gervais et al.

(10) Patent No.: US 10,831,341 B2
(45) Date of Patent: Nov. 10, 2020

(54) AUTOMATED DEVICE FOR DATA TRANSFER

(71) Applicant: The Toronto-Dominion Bank, Toronto (CA)

(72) Inventors: Steven Gervais, Newmarket (CA); Sara Durning, Toronto (CA); Amanda Buchanan, Toronto (CA); Na-Hyun Sophie Park, Toronto (CA); Gregory James Hamilton, Toronto (CA); Miguel Martin C. Florendo, Toronto (CA); Gary Joseph Fernandes, Mississauga (CA); Nikolay Tzankov Markov, Toronto (CA); Bridget Lennon, Cherry Hill, NJ (US); Tristian Rodzen, Norway, ME (US); James Grimmer, Yardley, PA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/152,066

(22) Filed: Oct. 4, 2018

(65) Prior Publication Data
US 2020/0110514 A1    Apr. 9, 2020

(51) Int. Cl.
*G06F 3/0482* (2013.01)
*G06Q 40/02* (2012.01)
(Continued)

(52) U.S. Cl.
CPC ........ *G06F 3/0482* (2013.01); *G06F 3/04847* (2013.01); *G06Q 20/1085* (2013.01); *G06Q 20/4014* (2013.01); *G06Q 40/02* (2013.01)

(58) Field of Classification Search
CPC ............... G06Q 40/02; G06Q 20/1085; G06Q 20/4014; G06F 3/0482; G06F 3/04847
See application file for complete search history.

(56) References Cited

U.S. PATENT DOCUMENTS 5,297,252 A    3/1994    Becker
6,012,048 A    1/2000    Gustin
(Continued)

FOREIGN PATENT DOCUMENTS

JP    2005149473    6/2005

OTHER PUBLICATIONS

Coconuts KL 2014 "Withdrawal systems: GST to be applied to ATM and banking services" <https://coconuts.co/kl/news/withdrawal-symptoms-gst-be-applied-atm-and-banking-services> (Year: 2014).*
(Continued)

*Primary Examiner* — Beau D Spratt
(74) *Attorney, Agent, or Firm* — Ridout and Maybee LLP

(57) ABSTRACT

An automated device for data transfer and associated methods is provided. The automated device communicates with a server to exchange data which is used to dynamically populate one or more of the interfaces in a sequence of interfaces that include a welcome interface providing a plurality of selectable options for performing an action using the automated device; an authentication interface for receiving an authentication code associated with an access card inserted into the automated device; a source selection interface for selecting a source account for the data transfer; a destination selection interface for selecting a destination account for the data transfer; a data value selection interface for receiving a data value for the data transfer; a transaction acknowledgment interface providing an option to end the session and an option to continue the session; and a record preview interface providing a preview of a record of the session and an option to generate output of the record.

20 Claims, 29 Drawing Sheets

(51) Int. Cl.
  *G06F 3/0484* (2013.01)
  *G06Q 20/40* (2012.01)
  *G06Q 20/10* (2012.01)

(56) References Cited

U.S. PATENT DOCUMENTS

| | | | |
|---|---|---|---|
| 6,966,034 | B2 | 11/2005 | Narin |
| 7,039,600 | B1 | 5/2006 | Meek et al. |
| 7,051,096 | B1 | 5/2006 | Krawiec et al. |
| 7,090,122 | B1 | 8/2006 | Warren et al. |
| 7,225,156 | B2 | 5/2007 | Fisher et al. |
| 7,229,007 | B1 | 6/2007 | Swaine |
| 7,570,646 | B2 | 8/2009 | Li et al. |
| 7,637,421 | B1 | 12/2009 | Trocme |
| 7,644,041 | B1 | 1/2010 | Schultz et al. |
| 7,657,473 | B1 | 2/2010 | Meffie |
| 7,753,772 | B1 | 7/2010 | Walker |
| 8,608,057 | B1 | 12/2013 | Crews et al. |
| 9,004,353 | B1 | 4/2015 | Black |
| 9,038,188 | B2 | 5/2015 | Adams et al. |
| 9,196,111 | B1 | 11/2015 | Newman et al. |
| 9,292,840 | B1 | 3/2016 | Velline et al. |
| 9,589,256 | B1 | 3/2017 | Thomas |
| 9,953,367 | B2 | 4/2018 | Del Vecchio et al. |
| 9,984,411 | B1 | 5/2018 | Velline et al. |
| 10,078,769 | B2 | 9/2018 | Bouteleux |
| 10,332,201 | B1* | 6/2019 | Kunz ................... G06Q 20/00 |
| 10,535,047 | B1 | 1/2020 | Thomas et al. |
| 2001/0014881 | A1 | 8/2001 | Drummond et al. |
| 2001/0044747 | A1 | 11/2001 | Ramachandran et al. |
| 2002/0196238 | A1 | 12/2002 | Tsukada et al. |
| 2003/0033249 | A1 | 2/2003 | Ingram et al. |
| 2003/0046234 | A1 | 3/2003 | Takadachi |
| 2003/0105710 | A1* | 6/2003 | Barbara ................ G06Q 20/04 |
| | | | 705/39 |
| 2003/0217005 | A1 | 11/2003 | Drummond et al. |
| 2004/0066374 | A1 | 4/2004 | Holloway et al. |
| 2004/0215566 | A1 | 10/2004 | Meurer |
| 2005/0035193 | A1 | 2/2005 | Gustin |
| 2005/0209958 | A1 | 9/2005 | Michelsen et al. |
| 2005/0233797 | A1 | 10/2005 | Gilmore et al. |
| 2006/0026114 | A1 | 2/2006 | Gregoire et al. |
| 2006/0038004 | A1 | 2/2006 | Rielly et al. |
| 2006/0139312 | A1 | 6/2006 | Sinclair et al. |
| 2006/0163341 | A1 | 7/2006 | Tulluri et al. |
| 2007/0181676 | A1 | 8/2007 | Mateen et al. |
| 2007/0215686 | A1 | 9/2007 | Matson |
| 2008/0040265 | A1 | 2/2008 | Rackley, III et al. |
| 2009/0108015 | A1 | 4/2009 | Kreamer |
| 2009/0212104 | A1 | 8/2009 | Smith et al. |
| 2010/0031021 | A1 | 2/2010 | Arnold et al. |
| 2010/0255885 | A1 | 10/2010 | Lee et al. |
| 2011/0022484 | A1 | 1/2011 | Smith et al. |
| 2011/0113328 | A1 | 5/2011 | Marzke |
| 2011/0184865 | A1 | 7/2011 | Mon et al. |
| 2011/0251956 | A1 | 10/2011 | Cantley et al. |
| 2011/0288997 | A1 | 11/2011 | McBride |
| 2012/0074217 | A1 | 3/2012 | Block et al. |
| 2012/0173348 | A1 | 7/2012 | Yoo |
| 2012/0197797 | A1 | 8/2012 | Grigg et al. |
| 2012/0330769 | A1 | 12/2012 | Arceo |
| 2013/0018787 | A1 | 1/2013 | Anderws et al. |
| 2013/0212015 | A1 | 8/2013 | Anthony et al. |
| 2014/0331131 | A1 | 11/2014 | DeSellem |
| 2014/0331189 | A1 | 11/2014 | Lee |
| 2014/0372268 | A1 | 12/2014 | Hazam |
| 2015/0046794 | A1 | 2/2015 | Cardno |
| 2015/0066761 | A1 | 3/2015 | Chang |
| 2015/0149963 | A1 | 5/2015 | Chang et al. |
| 2015/0178730 | A1 | 6/2015 | Gleeson et al. |
| 2015/0186857 | A1 | 7/2015 | Swinfen |
| 2015/0199681 | A1 | 7/2015 | Salgado et al. |
| 2015/0212677 | A1 | 7/2015 | Dunne et al. |
| 2015/0262183 | A1 | 9/2015 | Gervais |
| 2015/0301722 | A1 | 10/2015 | Warnitz |
| 2016/0086145 | A1 | 3/2016 | Tsutsui |
| 2016/0098692 | A1 | 4/2016 | Johnson et al. |
| 2016/0098904 | A1 | 4/2016 | Choudhury et al. |
| 2016/0180304 | A1* | 6/2016 | Carriles ................ G06Q 20/10 |
| | | | 705/44 |
| 2016/0364729 | A1 | 12/2016 | Ruparelia et al. |
| 2017/0003856 | A1* | 1/2017 | Mande ................ G06Q 30/016 |
| 2017/0006013 | A1 | 1/2017 | Mande et al. |
| 2017/0006028 | A1 | 1/2017 | Tunnell et al. |
| 2017/0006114 | A1 | 1/2017 | Mande et al. |
| 2017/0039818 | A1 | 2/2017 | Lee |
| 2017/0091731 | A1 | 3/2017 | Nelson |
| 2017/0168691 | A1 | 6/2017 | Johansson |
| 2017/0352021 | A1 | 12/2017 | Szeto et al. |
| 2018/0039616 | A1 | 2/2018 | Shalit et al. |
| 2018/0096302 | A1 | 4/2018 | Tseretopoulos et al. |
| 2018/0114004 | A1 | 4/2018 | Hamid |
| 2018/0225659 | A1 | 8/2018 | Yamasaki et al. |
| 2018/0268414 | A1* | 9/2018 | Chung ............ G06Q 20/40145 |
| 2018/0268637 | A1 | 9/2018 | Kurian et al. |
| 2019/0012882 | A1* | 1/2019 | Poueriet ................ G06F 3/0482 |
| 2019/0073663 | A1 | 3/2019 | Jamkhedkar et al. |

OTHER PUBLICATIONS

Isa Tala, Designing Haptic Clues for Touchscreen Kiosks, MS Thesis, University of Tampere, https://tampub.uta.fi/bitstream/handle/10024/99652/GRADU-1472825234.pdf?sequence=1&isAllowed=y 2016.

Leah Findlater and Joanna McGrenere, Beyond performance: Feature awareness in personalized interfaces, International Journal of Human-Computer Studies 68.3 (2010): 121-137, http://faculty.washington.edu/leahkf/pubs/IJHCS%20personalization%20author%20copy.pdf 2010.

Ahmed Farooq, Haptics in Kiosks and ATMs for the Disabled, University of Tampere, http://tampub.uta.fi/bitstream/handle/10024/81075/gradu03909.pdf;sequence=1 2009.

Lee, "ATM UI Prototyping/ Renovation", slideshare, drafted Jul. 6, 2011, uploaded Jul. 28, 2011 Jul. 28, 2011.

EMV Migration Forum, "Implementing EMV at the ATM: PIN Change at the ATM, Version 1.0", An EMV Migration Forum White Paper, Mar. 2015. 2015.

HowToBank, "How to ATM Change PIN", video on Youtube, published on Feb. 27, 2014. 2014.

Kumar, "How to Transfer Money to Other Bank Account Through CDM (Cardless)", Accounting Education, published on Dec. 21, 2015. 2015.

TD Canada Trust, "Ways to Bank—Green Machine ATM—How to Transfer Between Acocunts", company website, accessed Aug. 18, 2014. 2014.

Scholl, "Bank of America ATM Deposit", video on YouTube, published Oct. 6, 2016. 2016.

Brouillette, "Making ADA Compliance A Priority", Advanced Kiosks, published May 15, 2018. 2018.

ShinyPress, Using a Bank Machine (ATM) to Make a Withdrawal, video on YouTube, published on Jul. 8, 2013. 2013.

Iucadp, "Concept of ATM", stock image on CANSTOCKPHOTO, published on Mar. 3, 2016. 2016.

Thunder Tech Pro, "How to Use ATM. Simple Video. Step by Step Full Procedure", video on YouTube, published on Apr. 22, 2017. 2017.

BhattiXpert, "How to Use ATM Machine HBL (2017))", video on YouTube, published on Dec. 29, 2016. 2016.

TD Bank, "How Do I Change My PIN Number", TD Bank website, employee Colleen B on Mount Laurel on Sep. 10, 2014. 2014.

Selco Community Credit Union, "How to Deposit Checks in Our Upgraded ATMs", Feb. 7, 2013, YouTube Video—https://www.youtube.com/watch?v=MxfjdDcRGi8. 2013.

Forward Bank, "Smart Deposit ATM Demo", Oct. 31, 2014, YouTube video—https://www.youtube.com/watch?v=aoHoD5Evot4. 2014.

NCR Corporation, "Intelligent ATM Machines: NCR Intelligent Check Deposit Video"—May 4, 2015, YouTube video—https://www.youtube.com/watch?v=2xT96BrVBXo. 2015.

(56) References Cited

OTHER PUBLICATIONS

Lego Bank, "How to Lodge Money in a Cash and Cheque Lodgement ATM", Feb. 8, 2015, YouTube video—https://www.youtube.com/watch?v=fvw0mhemUYs. 2015.
Scholl, "US Bank ATM Check Deposit", Mar. 30, 2015, YouTube video—https://youtube.com/watch?v=4oxq0tgwpL4. 2015.
Pinay Investor, "How to Check Transactions in BPI Express Online", Nov. 2, 2015, YouTube video—https://www.youtube.com/watch?v=KD2SWCs7nYA. 2015.
Rathaur, "How to Deposit Money in ATM", Mar. 23, 2016, YouTube video—https://youtube.com/watch?v=RQbjXtJVJ_o. 2016.
Scholl, "How Easy it is to Deposit Money into the Bank of America ATM", Oct. 1, 2016, YouTube video—https://www.youtube.com/watch?v=sRdyalenYZQ. 2016.
Office Action; U.S. Appl. No. 16/152,074; dated Oct. 2, 2019.
NCR Corporation (https://www.youtube.com/watch?v+1Wh7kZ70piQ), "Intelligent ATM Machines: NCR Intelligent Cash Deposit"—May 4, 2015. 2015.
Scholl, "How easy is it to Deposit money into the Bank of America ATM", https://www.youtube.com/watch?v=sRdyalenYZQ, Oct. 1, 2016. 2016.
Emirates NBD, "How to deposit Cheque into CDMs", https://www.youtube.com/watch?v=c4rhspQBKas, Aug. 30, 2016. 2016.
NCR Corporation, NCR SelfServ 80 Series ATM Family, https://www.youtube.com/watch?v=7MICCIn9RO0, Oct. 18, 2017. 2017.
NCR Corporation, "NCR Scalable Deposit Modile (SDM) Banking Software Video", https://www.youtube.com/watch?v=qQWKk3RdK8, Nov. 13, 2017. 2017.
Firstbankok, "FirstBank ATM Deposit", https://www.youtube.com/watch?v=594inG4tgpE, Nov. 13, 2017. 2017.
Regions Bank, "Regions DepositSmart ATMs | Regions Bank", https://www.youtube.com/watch?v=2A0i25M9IW0, Sep. 26, 2017. 2017.
SewGenius, "Flow to do a check deposit on a Suntrust Bank ATM", https://www.youtube.com/watch?v=puxovvQkfYk, Aug. 27, 2017. 2017.
Office Action; U.S. Appl. No. 16/152,027; dated Jan. 22, 2020.
Office Action; U.S. Appl. No. 16/152,083; dated Jan. 30, 2020.
Office Action; U.S. Appl. No. 16/152,113; dated Jan. 2, 2020.
Office Action; U.S. Appl. No. 16/152,074 dated Feb. 10, 2020.
Office Action; U.S. Appl. No. 16/152,054 dated Apr. 6, 2020.
Final Rejection; U.S. Appl. No. 16/152,113 dated May 28, 2020.
Advisory Action; U.S. Appl. No. 16/152,074 dated Apr. 17, 2020.
Office Actiion; U.S. Appl. No. 16/392,905 dated Jun. 16, 2020.
Final Rejection, U.S. Appl. No. 16/152,083 dated Jul. 9, 2020.
J.D. Biersdorfer Q and A: Scanning Checks at the ATM; the new york times blog May 8, 2013.
Final Rejection; U.S. Application No. 16/152,027 dated Jul. 16, 2020.
Prasanna Zore, Things you can do with your ATM Card Feb. 21, 2007.
TheFinancialBrand, Wells Fargo's ATMs know you better Feb. 20, 2013.
Advisory Action; U.S. Appl. No. 16/152,113 dated Aug. 17, 2020.
Office Action; U.S. Appl. No. 16/152,074 dated Sep. 9, 2020.
Mengxing Zhang et al., A Survey on Human Computer Interaction Technology for Financial Terminals; pp. 174-177 2012.
Office Action; U.S. Appl. No. 16/152,143 dated Sep. 11, 2020.

* cited by examiner

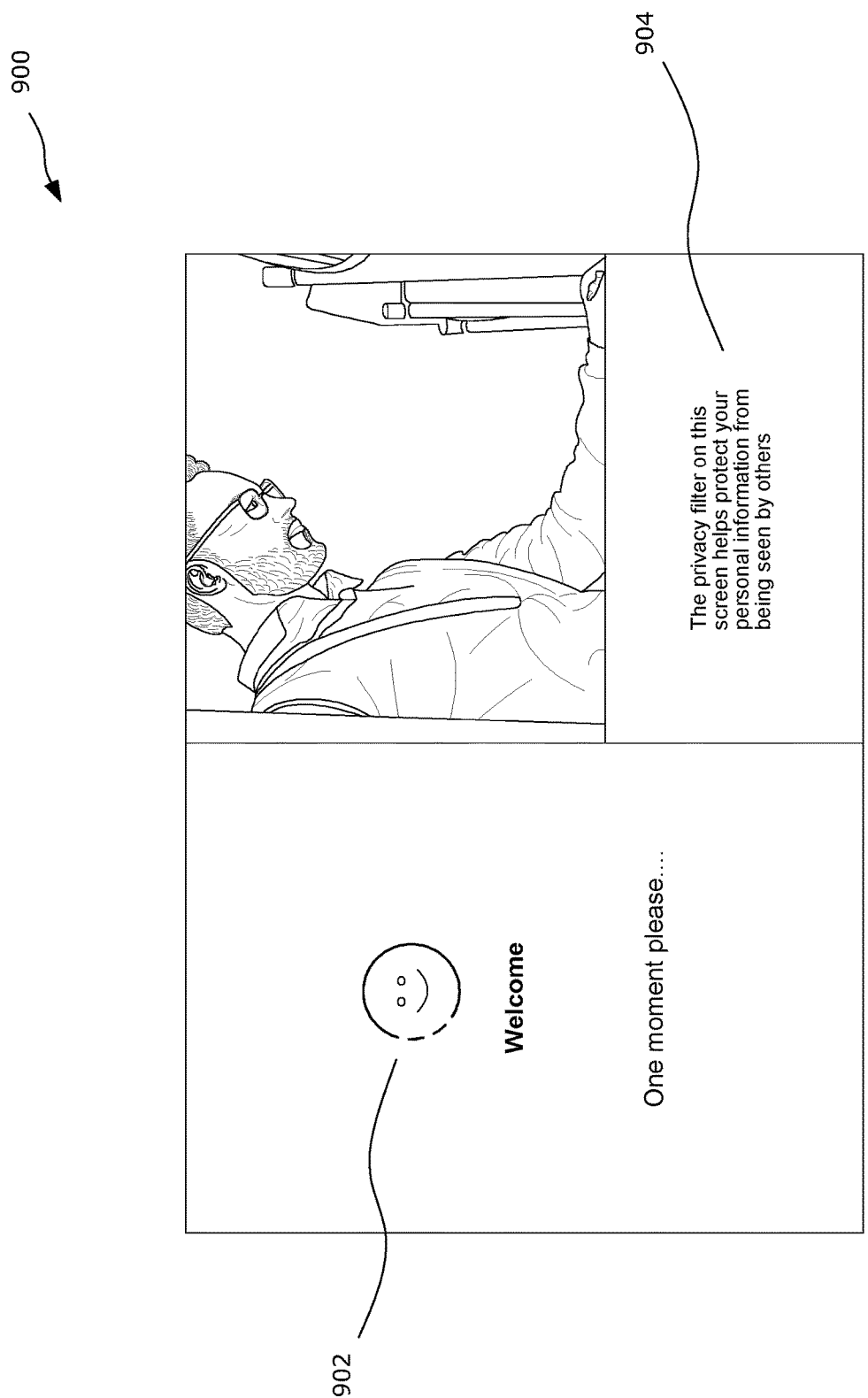

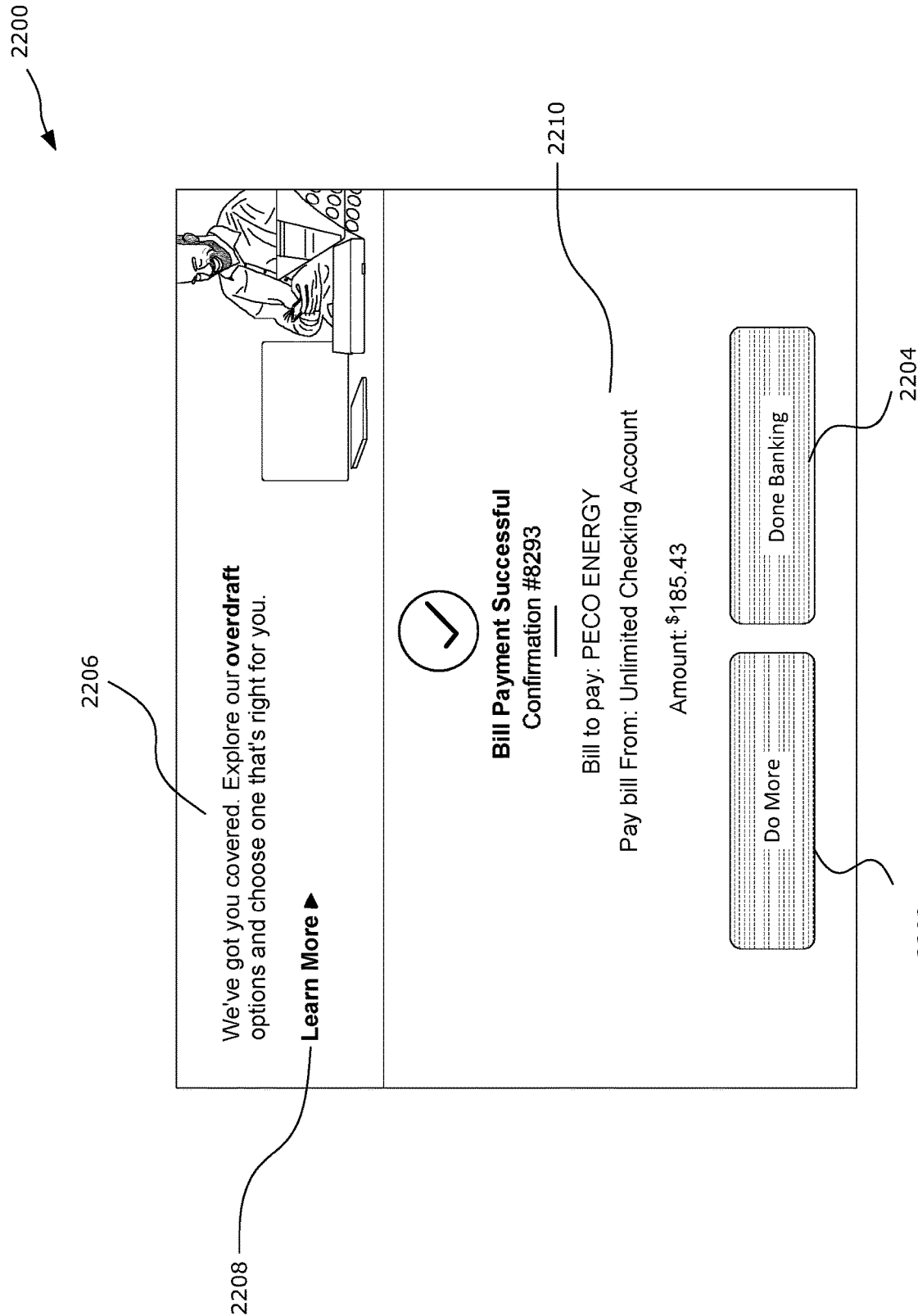

AUTOMATED DEVICE FOR DATA TRANSFER

TECHNICAL FIELD

The present disclosure is related to an automated device, and in particular, to an automated device providing an interface enabling data transfers.

BACKGROUND

An automated device may enable a user to perform a variety of actions related to a user account. The automated device may enable exchange of data with a backend server that manages the user account to update, output information about, or otherwise perform an action related to the user account. The automated device may provide a sequence of interfaces to enable the user to perform a selected action related to the user account. For example, the automated device may be an automated teller machine (ATM), which may provide a sequence of interfaces to enable the user to perform an action related to the user's account at a service provider such as a financial institution.

User interaction with such an automated device may be time-consuming and frustrating for a number of reasons. For example, a user may find it time-consuming when there are a high number of inputs required to complete a desired action, or a user may find it frustrating when there is too much or too little information provided during the interaction. Further, interactions with the automated device can be challenging and prone to errors for certain users, particularly seniors, users with disabilities, users with language comprehension challenges, and users who are uncomfortable with technology. Accordingly, there is a need for improved methods, devices and systems related to user interactions with automated devices.

BRIEF DESCRIPTION OF THE DRAWINGS

FIG. 9 is an example authentication waiting interface in accordance with example embodiments of the present disclosure.

FIG. 22 is an acknowledgement interface indicating completion of the data transfer via the method of FIG. 18 in accordance with example embodiments of the present disclosure.

DESCRIPTION OF EXAMPLE EMBODIMENTS

Figure 1:
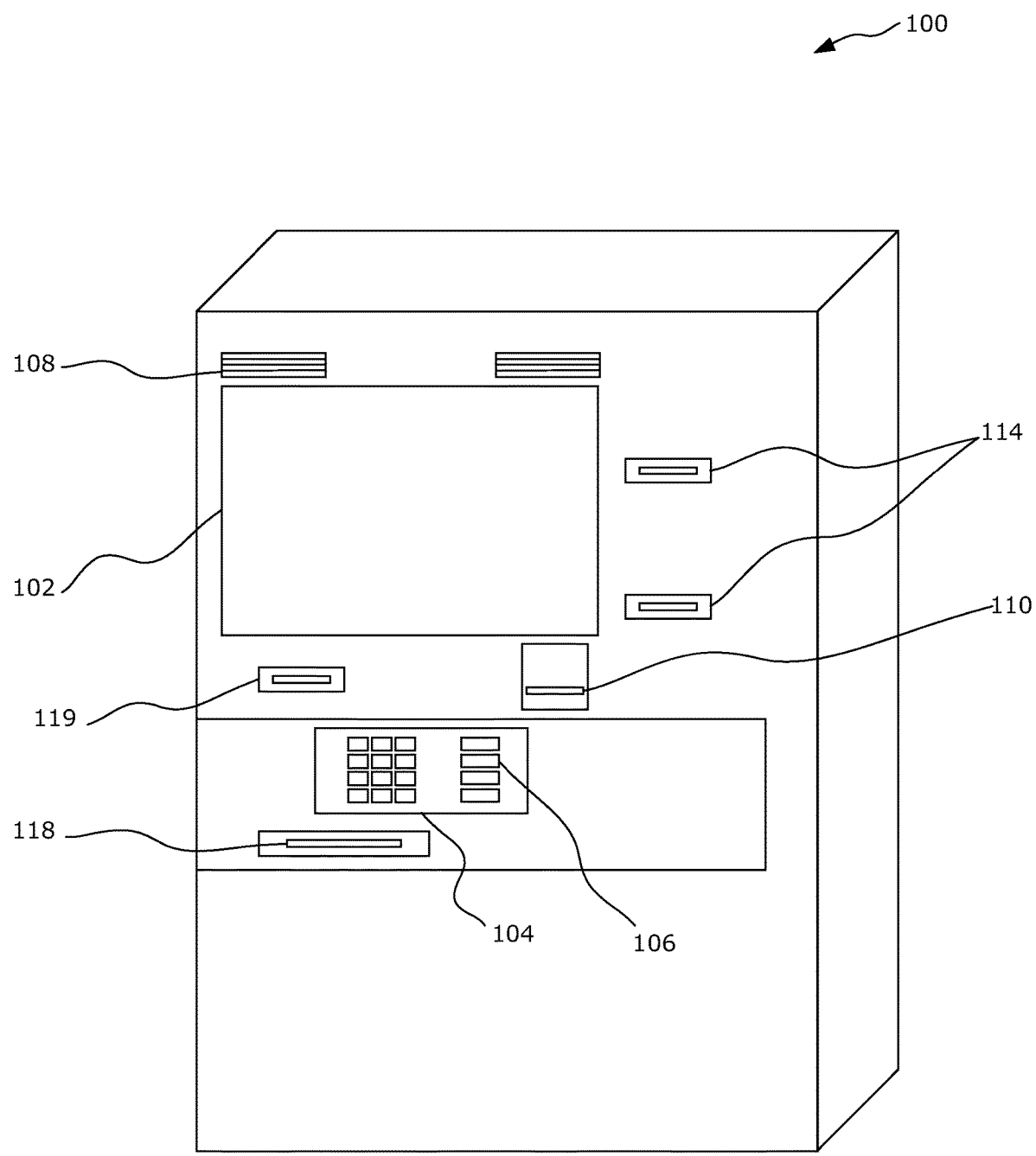
FIG. 1 is a schematic diagram of an automated device in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context. The term "directly" is used herein to mean automatically and without intervening operations.

The present disclosure provides an automated device for data transfer and associated methods. The automated device communicates with a server to exchange data which is used to dynamically populate one or more of the interfaces in a sequence of interfaces.

In accordance with one embodiment of a first aspect of the present disclosure, there is provided an automated device comprising: a display screen; a communication module for communication with a server; a processor coupled to the display screen and the communication module; and a memory coupled to the processor, the memory having computer-executable instructions stored thereon, the instructions, when executed by the processor, causing the automated device to, during a session: display, on the display screen, a welcome interface providing a plurality of selectable options for performing an action using the automated device; directly in response to selection of an option to initiate a data transfer from the welcome interface, display, on the display screen, an authentication interface providing an input field for receiving an authentication code associated with an access card inserted into the automated device; directly in response to receipt of validation of an input received in the input field of the authentication interface, display, on the display screen, a source selection interface providing a selectable option for selecting a source account for the data transfer; directly in response to a selection of the source account, display, on the display screen, a destination selection interface providing a selectable option for selecting a destination account for the data transfer; directly in response to the selection of the destination account, display, on the display screen, a data value selection interface providing an input field for receiving a data value for the data transfer; directly in response to a receipt of confirmation of an input received in the input field of the data value selection interface, send a signal to the server, via the communication module, the signal including the source account, the destination account and the data value for the data transfer; directly in response to receipt of a signal including an indication that the data transfer was completed from the server via the communication module, display, on the display screen, a transaction acknowledgment interface indicating completion of the data transfer, the transaction acknowledgment interface providing an option to end the session and an option to continue the session; and directly in response to selection of the option to end the session in the transaction acknowledgment interface, display, on the display screen, a record preview interface providing a preview of a record of the session and an option to generate output of the record.

In accordance with another embodiment of the first aspect of the present disclosure, there is provided a method at an automated device, comprising: displaying a welcome interface providing a plurality of selectable options for performing an action using the automated device; directly in response to a selection of an option to initiate a data transfer from the welcome interface, displaying an authentication interface providing an input field for receiving an authentication code associated with an access card inserted into the automated device; directly in response to receipt of validation of an input received in the input field of the authentication interface, displaying a source selection interface providing a selectable option for selecting a source account for the data transfer; directly in response to selection of the source account, displaying a destination selection interface providing a selectable option for selecting a destination account for the data transfer; directly in response to selection of the destination account, displaying a data value selection interface providing an input field for receiving a data value for the data transfer; directly in response to receipt of confirmation of an input received in the input field of the data value selection interface, sending a signal to a server in communication with the automated device, via a communication module, the signal including the source account, the destination account and the data value for the data transfer; directly in response to receipt of a signal including an indication that the data transfer was completed from the server via the communication module, displaying a transaction acknowledgment interface indicating completion of the data transfer, the transaction acknowledgment interface providing an option to end the session and an option to continue the session; and directly in response to selection of the option to end the session in the transaction acknowledgment interface, displaying a record preview interface providing a preview of a record of the session and an option to generate output of the record.

In accordance with one embodiment of a second aspect of the present disclosure, there is provided an automated device comprising: a display screen; a communication module for communication with a server; a processor coupled to the display screen and the communication module; and a memory coupled to the processor, the memory having computer-executable instructions stored thereon, the instructions, when executed by the processor, causing the automated device to, during a session: display, on the display screen, a welcome interface providing a plurality of selectable options for performing an action using the automated device; directly in response to selection of an option to display more available actions, display, on the display screen, an authentication interface providing an input field for receiving an authentication code associated with an access card inserted into the automated device; directly in response to receipt of validation of an input received in the input field of the authentication interface, display, on the display screen, a home interface providing a plurality of selectable options for performing an action using the automated device, wherein the selectable options of the home interface include additional selectable options that are not present on the welcome interface; directly in response to selection of an option to initiate a data transfer from the home interface, display, on the display screen, a source selection interface providing a selectable option for selecting a source account for the data transfer; directly in response to selection of the source account, display, on the display screen, a destination selection interface providing a selectable option for selecting a destination account for the data transfer; directly in response to selection of the destination account, display, on the display screen, a data value selection interface providing an input field for receiving a data value for the data transfer; directly in response to receipt of confirmation of an input received in the input field of the data value selection interface, send a signal to the server, via the communication module, the signal including the source account, the destination account and the data value for the data transfer; directly in response to receipt of a signal from the server including an indication that the data transfer was completed via the communication module, display, on the display screen, a transaction acknowledgment interface indicating completion of the data transfer, the transaction acknowledgment interface providing an option to end the session and an option to continue the session; and directly in response to selection of the option to end the session in the transaction acknowledgment interface, display, on the display screen, a record preview interface providing a preview of a record of the session and an option to generate output of the record.

In accordance with another embodiment of the second aspect of the present disclosure, there is provided a method at an automated device, comprising: displaying a welcome interface providing a plurality of selectable options for performing an action using the automated device; directly in response to selection of an option to display more available actions, displaying an authentication interface providing an input field for receiving an authentication code associated with an access card inserted into the automated device; directly in response to receipt of validation of an input received in the input field of the authentication interface, displaying a home interface providing a plurality of selectable options for performing an action using the automated device, wherein the selectable options of the home interface include additional selectable options that are not present on the welcome interface; directly in response to selection of an option to initiate a data transfer from the home interface, displaying a source selection interface providing a selectable option for selecting a source account for the data transfer; directly in response to selection of the source account, displaying a destination selection interface providing a selectable option for selecting a destination account for the data transfer; directly in response to selection of the destination account, displaying a data value selection interface providing an input field for receiving a data value for the data transfer; directly in response to receipt of confirmation of an input received in the input field of the data value selection interface, sending a signal to the server, via the communication module, the signal including the source account, the destination account and the data value for the data transfer; directly in response to receipt of a signal from the server including an indication that the data transfer was completed via the communication module, displaying a transaction acknowledgment interface indicating completion of the data transfer, the transaction acknowledgment interface providing an option to end the session and an option to continue the session; and directly in response to selection of the option to end the session in the transaction acknowledgment interface, displaying a record preview interface providing a preview of a record of the session and an option to generate output of the record.

In accordance with one embodiment of a third aspect of the present disclosure, there is provided an automated device comprising: a display screen; a communication module for communication with a server; a processor coupled to the display screen and the communication module; and a memory coupled to the processor, the memory having computer-executable instructions stored thereon, the instructions, when executed by the processor, causing the automated device to, during a session: display, on the display screen, a welcome interface providing a plurality of selectable options for performing an action using the automated device; directly in response to selection of an option to display more available actions, display, on the display screen, an authentication interface providing an input field for receiving an authentication code associated with an access card inserted into the automated device; directly in response to receipt of validation of an input received in the input field of the authentication interface, display, on the display screen, a home interface providing a plurality of selectable options for performing an action using the automated device, wherein the selectable options for performing an action of the home interface include additional selectable options for performing an action that are not present on the welcome interface and one or more selectable account options; directly in response to selection of an account option from the home interface, display, on the display screen, an account history interface providing a listing of recent exchanges of data performed for the account and a plurality of selectable options for performing an action using the automated device; directly in response to selection of an option to initiate a data transfer from the account history interface, display, on the display screen, a destination selection interface providing a selectable option for selecting a destination account for the data transfer; directly in response to selection of the destination account, display, on the display screen, a data value selection interface providing an input field for receiving a data value for the data transfer; directly in response to receipt of confirmation of an input received in the input field of the data value selection interface, send a signal to the server, via the communication module, the signal including the source account, the destination account and the data value for the data transfer; directly in response to receipt of a signal from the server, via the communication module, including an indication that the data transfer was completed, display, on the display screen, a transaction acknowledgment interface indicating completion of the data transfer, the transaction acknowledgment interface providing an option to end the session and an option to continue the session; and directly in response to selection of the option to end the session in the transaction acknowledgment interface, display, on the display screen, a record preview interface providing a preview of a record of the session and an option to generate output of the record.

In accordance with another embodiment of the third aspect of the present disclosure, there is provided a method at an automated device, comprising: displaying a welcome interface providing a plurality of selectable options for performing an action using the automated device; directly in response to selection of an option to display more available actions, displaying an authentication interface providing an input field for receiving an authentication code associated with an access card inserted into the automated device; directly in response to receipt of validation of an input received in the input field of the authentication interface, displaying a home interface providing a plurality of selectable options for performing an action using the automated device, wherein the selectable options for performing an action of the home interface include additional selectable options for performing an action that are not present on the welcome interface and one or more selectable account options; directly in response to selection of an account option from the home interface, displaying an account history interface providing a listing of recent exchanges of data performed for the account and a plurality of selectable options for performing an action using the automated device; directly in response to selection of an option to initiate a data transfer from the account history interface, displaying a destination selection interface providing a selectable option for selecting a destination account for the data transfer; directly in response to selection of the destination account, displaying a data value selection interface providing an input field for receiving a data value for the data transfer; directly in response to receipt of confirmation of an input received in the input field of the data value selection interface, sending a signal to the server, via the communication module, the signal including the source account, the destination account and the data value for the data transfer; directly in response to receipt of a signal from the server including an indication that the data transfer was completed via the communication module, displaying a transaction acknowledgment interface indicating completion of the data transfer, the transaction acknowledgment interface providing an option to end the session and an option to continue the session; and directly in response to selection of the option to end the session in the transaction acknowledgment interface, displaying a record preview interface providing a preview of a record of the session and an option to generate output of the record.

In accordance with one embodiment of a fourth aspect of the present disclosure, there is provided an automated device comprising: a display screen; a communication module for communication with a first party server; a processor coupled to the display screen and to the communication module; and a memory coupled to the processor, the memory having machine-executable instructions stored thereon, the instructions, when executed by the processor, causing the automated device to, during a session: display, on the display screen, a home interface providing a plurality of selectable options for performing an action using the automated device; directly in response to selection of an option to initiate a data transfer, display, on the display screen, a destination selection interface providing a selectable option for selecting a destination account to receive the data transfer, the destination account being managed by a third-party service provider, the destination account being identified using information received via a first signal from the first party server; directly in response to selection of the destination account, display, on the display screen, a source selection interface providing a selectable option for selecting a source account for the data transfer; directly in response to selection of the source account, display, on the display screen, a data value selection interface for receiving a first input indicating a data value for the data transfer; directly in response to receipt of the first input indicating the data value, transmit a second signal to the first party server, via the communication module, the second signal including the data value and including information identifying the source account and the destination account; display, on the display screen, a data transfer processing interface providing output indicating processing of the data transfer; directly in response to receipt of a third signal from the first party server, via the communication module acknowledging the data transfer, display, on the display screen, an acknowledgement interface indicating completion of the data transfer, the acknowledgement interface further providing an option to end the session and an option to continue the session; and directly in response to selection of the option to end the session, display, on the display screen, a record preview interface, the record preview interface providing a preview of a record of the session, the record preview interface further providing an option to generate output of the record.

In the fourth aspect, the option to generate output of the record may include an option to transmit the output of the record to an email address linked to the account, wherein a fourth signal is received from the first party server, via the communication module, the fourth signal including the email address, and wherein the option to transmit the output of the record to the email address includes a preview of the email address.

In the fourth aspect, the instructions may further cause the automated device to: directly in response to selection of an option on the record preview interface, display, on the display screen, a goodbye interface, the goodbye interface providing non-sensitive customer appreciation information specific to the account.

In the fourth aspect, the destination selection interface, source selection interface and data value selection interface may each includes a respective context indicator indicating that the destination selection interface, source selection interface and data value selection interface each is provided in the context of the data transfer.

In the fourth aspect, the context indicator of the source selection interface may further indicate the destination account for the data transfer, and wherein the context indicator of the data value selection interface further indicates the destination account and the source account for the data transfer.

In the fourth aspect, the instructions may further cause the automated device to: extract information from an access card inserted into the automated device; transmit a fifth signal to the first party server, via the communication module, the fifth signal including the information extracted from the access card; in response to receipt of a sixth signal from the first party server, via the communication module, the sixth signal providing information identifying at least the source account associated with the access card, display, on the display screen, a welcome interface, the welcome interface providing at least some of the plurality of selectable options for performing an action using the automated device; directly in response to selection of one of the selectable options provided by the welcome interface, display, on the display screen, an authentication interface for receiving an authentication code for the source account; transmit a seventh signal to the first party server, via the communication module, the seventh signal including a second input received via the authentication interface; display, on the display screen, an authentication waiting interface providing output indicating processing of the second input; and in response to receipt of an eighth signal from the first party server, via the communication module, that the second input is validated for the source account, proceed to display of the home interface.

In the fourth aspect, at least one of the home interface and the source selection interface may provide an option to display a current status of the source account.

In the fourth aspect, the destination selection interface may provide an option to display information about a historical data transfer to the destination account.

In the fourth aspect, the data value selection interface may provide an option to select a predetermined data value for the data transfer, the predetermined data value being a historical data value of a historical data transfer to the destination account.

In the fourth aspect, the instructions may further cause the automated device to: directly in response to selection, on the acknowledgement interface, of the option to continue the session, display, on the display screen, the home interface.

In accordance with another embodiment of the fourth aspect of the present disclosure, there is provided a method at an automated device, the method comprising: displaying a home interface providing a plurality of selectable options for performing an action using the automated device; directly in response to selection of an option to initiate a data transfer, displaying a destination selection interface providing a selectable option for selecting a destination account to receive the data transfer, the destination account being managed by a third-party service provider, the destination account being identified using information received via a first signal from a first party server that is in communication with the automated device; directly in response to selection of the destination account, displaying a source selection interface providing a selectable option for selecting a source account for the data transfer; directly in response to selection of the source account, displaying a data value selection interface for receiving a first input indicating a data value for the data transfer; directly in response to receipt of the first input indicating the data value, transmitting a second signal to the first party server, via a communication module of the automated device, the second signal including the data value and including information identifying the source account and the destination account; displaying a data transfer processing interface providing output indicating processing of the data transfer; directly in response to receipt of a third signal from the first party server, via the communication module acknowledging the data transfer, displaying an acknowledgement interface indicating completion of the data transfer, the acknowledgement interface further providing an option to end a session and an option to continue the session; and directly in response to selection of the option to end the session, displaying a record preview interface, the record preview interface providing a preview of a record of the session, the record preview interface further providing an option to generate output of the record.

In accordance with further embodiments of the present disclosure, there are provided non-transitory machine-readable mediums having tangibly stored thereon executable instructions for execution by a processor of a computing device such as a server. The executable instructions, when executed by the processor, cause the computing device to perform the methods described above and herein.

Figure 2:
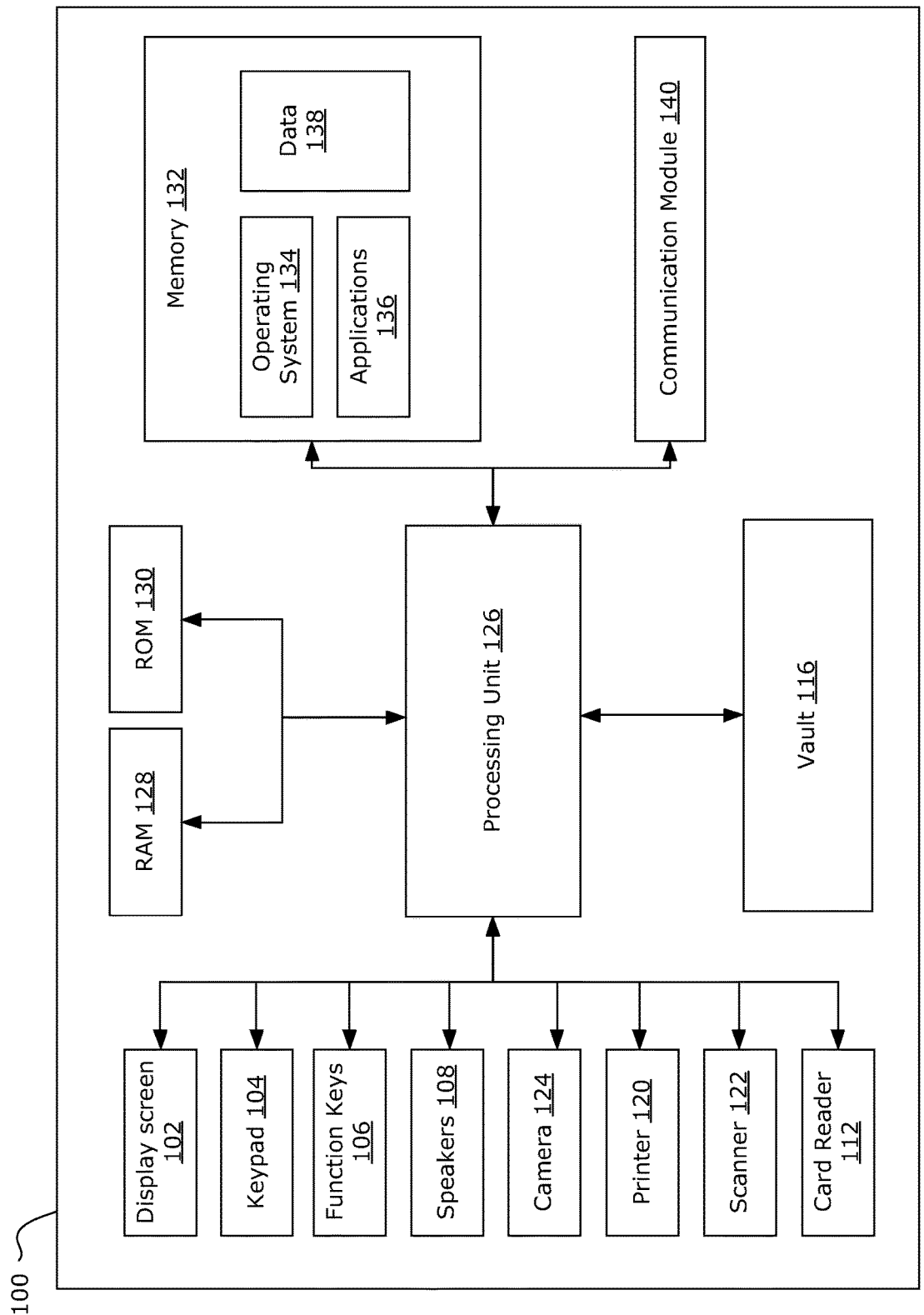
FIG. 2 is a block diagram showing some internal components of the automated device of FIG. 1.

FIGS. 1 and 2 show an example automated device 100 that may be used to implement example embodiments of the present disclosure. The automated device 100 includes one or more input and/or output (I/O) devices that facilitate interaction between the user and the automated device 100. As shown, a display screen 102 is provided which may be a touchscreen or non-touchscreen display. When the display screen 102 is a touchscreen display, the display screen 102 may serve as both an input device as well as an output device. A graphical user interface (GUI) may be displayed on the display screen 102 to enable any suitable textual and/or graphical output/input.

The example automated device 100 includes a keypad 104 which may be used to provide input to the automated device 100, for example to enter an authentication code (e.g., personal identification number (PIN)) and/or to provide numerical/non-numerical inputs. The keypad 104 may include keys for confirming/cancelling a particular action, and/or navigating through the interface provided by the automated device 100. In some examples, the keypad 104 may include function keys 106 that may be used for specific input (e.g., "Accept", "Cancel"), in addition to multi-function or alphanumeric input keys. In some embodiments, the keypad 104 may be equipped with braille (or other forms of tactile indicators) to improve accessibility for visually impaired users. The automated device 100 may include audio input/output devices, such as a microphone (not shown) for receiving audio user input and, as shown, one or more speakers 108 for providing audio output. Other examples of I/O devices may include, for example, a mouse, an optical reader, and/or a stylus (or other input device(s)) through which a user of the automated device 100 may provide input.

An access card may be received, through a card slot 110, into the automated device 100 to be read by a card reader 112. In some examples, the card reader 112 reads a magnetic strip on the back of the access card to extract information stored thereon. Information may be stored in an integrated circuit (IC) chip embedded within the access card in addition to, or instead of, the magnetic strip, which may be read by the card reader 112. The information read by the card reader 112 may be used to perform functions such as card authentication, card holder validation, and/or account information retrieval.

User interactions with the automated device 100 may include insertion of physical input (e.g., cash and/or check, or other physical representations of data) through one or more input slots 114. The automated device 100 may incorporate sensors (e.g., an optical scanner 122) and/or a digital image processor (not shown) to process the received physical input. Physical output, such as cash, may be extracted from a vault 116 inside the automated device 100 and dispensed to the user through an output slot 118. Another output slot 119 may be used to provide a physical record, such as a paper receipt, of the user's interactions with the automated device 100 during a session. A session on the automated device 100 may be defined to include the inputs, outputs provided on the automated device 100 from the start of user interaction with the automated device 100 (e.g., starting with insertion of an access card into the card slot 110) and ending when the user chooses to end interactions with the automated device 100 (e.g., user provides input to the automated device 100 indicating that all desired actions have completed and/or user logs out). The physical record may be generated by a printer 120 inside the automated device 100. Additionally or alternatively, a record of the session may be emailed to the user. The automated device 100 may include a camera 124, which may be used to record video (e.g., for security purposes) and/or to facilitate interaction between the user and a local or remote agent.

Internally, the automated device 100 includes a processing unit 126 for controlling overall operation of the automated device 100. The processing unit 126 may be operably coupled to one or more of random access memory (RAM) 128, read-only memory (ROM) 130, memory 132, and input/output (I/O) devices such as those described above. Machine-executable instructions may be stored within memory 132 and/or other storage to provide instructions to the processing unit 126 for enabling the automated device 100 to perform various functions. For example, the memory 132 may store instructions for implementing an operating system 134, and one or more application programs 136. The memory 132 may also store data 138 locally. Additionally or alternatively, some or all of the machine-executable instructions for the automated device 100 may be embodied in hardware or firmware (not shown). In this example, the automated device 100 further includes a communication module 140, for wired and/or wireless communication with other network devices (see FIG. 3, for example).

Figure 3:
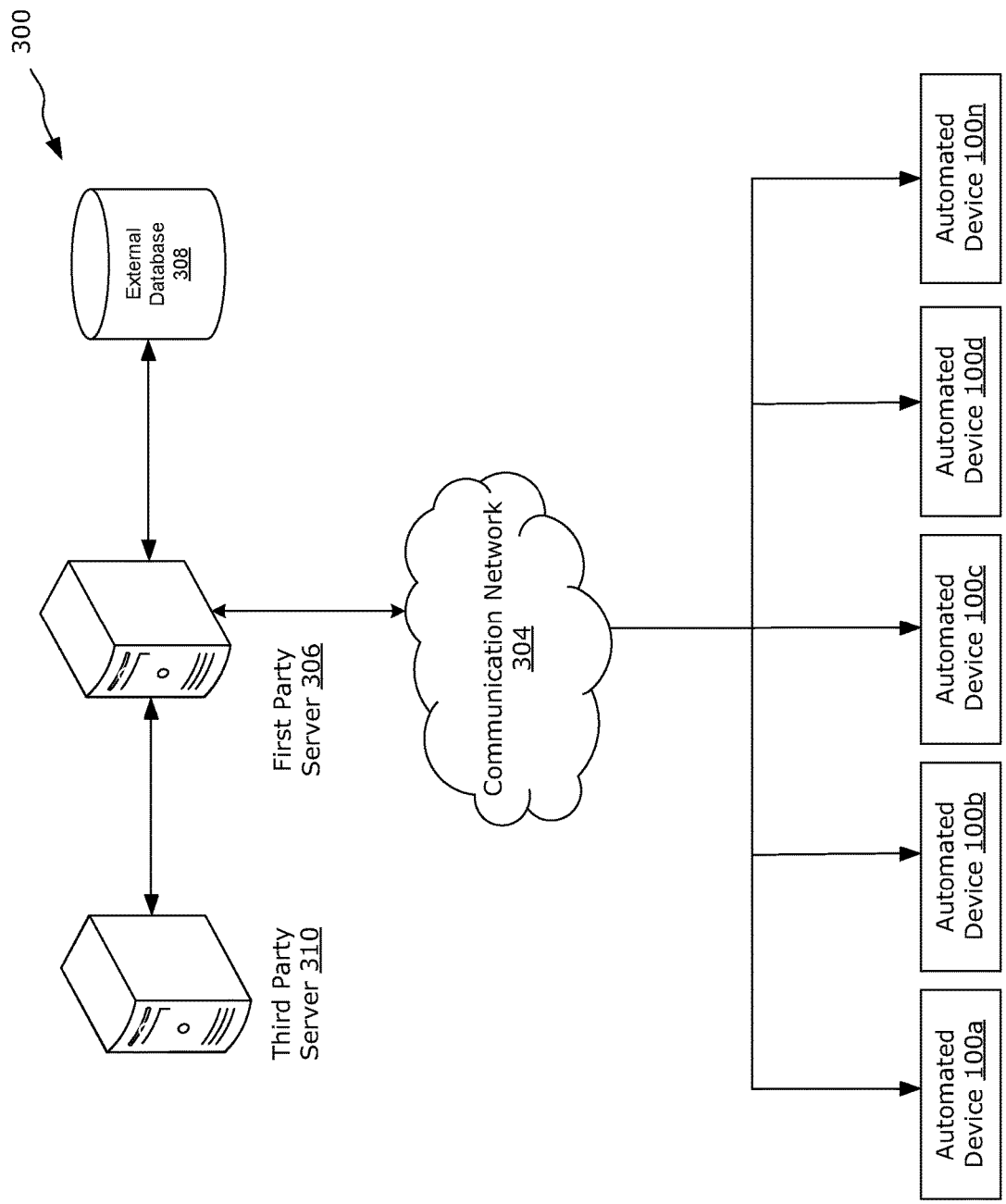
FIG. 3 is a schematic diagram of an example network environment in which example embodiments of the present disclosure may be implemented.

FIG. 3 shows an example network 300 in which the example automated device 100 may be implemented. In this example, a plurality of automated devices 100a-100n may be connected through a communication network 304 to a first-party server 306 via any suitable communications links, such as network links, wireless links, hard-wired links, and the like. Each of the automated devices 100a-100n may be an instance of the automated device 100 of FIG. 1, or other suitable automated device. The automated devices 100a-100n may be the same or different from each other.

The communication network 304 may include any one or more suitable computer networks including, for example, the Internet, an intranet, a wide-area network (WAN), a wireless WAN (WWAN), a local-area network (LAN), a wireless LAN (WLAN), a wireless network, a digital subscriber line (DSL) network, a frame relay network, an asynchronous transfer mode network, a virtual private network (VPN), a public-switched telephone network (PSTN), or a public-land mobile network (PLMN), or any combination of any of the same. Network communications may be facilitated through the use of any suitable communication such as TCP/IP, Ethernet, FTP, HTTP, HTTPS, and the like. The communication network 304 may be, or comprise, the interbank network (also referred to as the ATM consortium or ATM network).

The first-party server 306 may be a backend server associated with the same service provider as the automated devices 100a-100e. The first-party server 306 may be operable to communicate signals and exchange data with each of the plurality of automated devices 100a-100e. The first-party server 306 in this example network 300 is also coupled to a database 308 that may store data accessible by the first-party server 306. The data stored by the database 308 comprises user account information and provisioning data for data transfers in corresponding records. The database 308 is located externally to and remote from the automated devices 100. The first-party server 306 in this example network 300 is also coupled to a third-party server 310, which may provide third-party services, such as authentication services, or may be associated with another service provider (e.g., another financial institution). The first-party server 306 may be coupled to the database 308 and/or the third-party server 310 via one or more networks (not shown). It is to be appreciated that although one instance each of the first-party server 306, database 308, third-party server 310 and communication network 304 are shown, any of the components in FIG. 3 may be present in any number.

The first-party server 306 comprises a controller comprising at least one processor which controls the overall operation of the first-party server 306. The processor is coupled to a plurality of components via a communication bus which provides a communication path between the components and the processor. The processor is coupled to a communication module that communicates with corresponding communication modules of automated devices 100 and third-party server 310 by sending and receiving corresponding signals. The first-party server 306 may comprise, or communicate with, a data transfer server which generates data transfer instructions via an instruction generation module, sends and/or receives data transfer instructions between various endpoints (e.g., automated devices 100, first-party server 306, third-party server 310, etc.) and which processes data transfer instructions via an instruction processing module.

The implementation of the methods described herein include a sequence of interfaces, also referred to as user interfaces or graphical user interfaces (GUIs), to be provided by the automated device, as discussed below. One or more interfaces in the interface sequence may provide one or more selectable options as discussed below, each selectable option being selectable, for example by interacting with a touchscreen and/or a keypad 104 of the automated device 100. The selection options are provided in onscreen buttons or other user interface elements. The selectable options, when selected via corresponding interaction, cause different interfaces to be displayed which may, in some instances, involve communications between the automated device 100 and the first-party server 306 to obtain information to dynamically populate interfaces in the interface sequence. The methods described herein may be implemented during a session with the automated device 100, for example as a portion of the session. The methods described herein may be implemented together to provide a sequence of interfaces.

Figure 4:
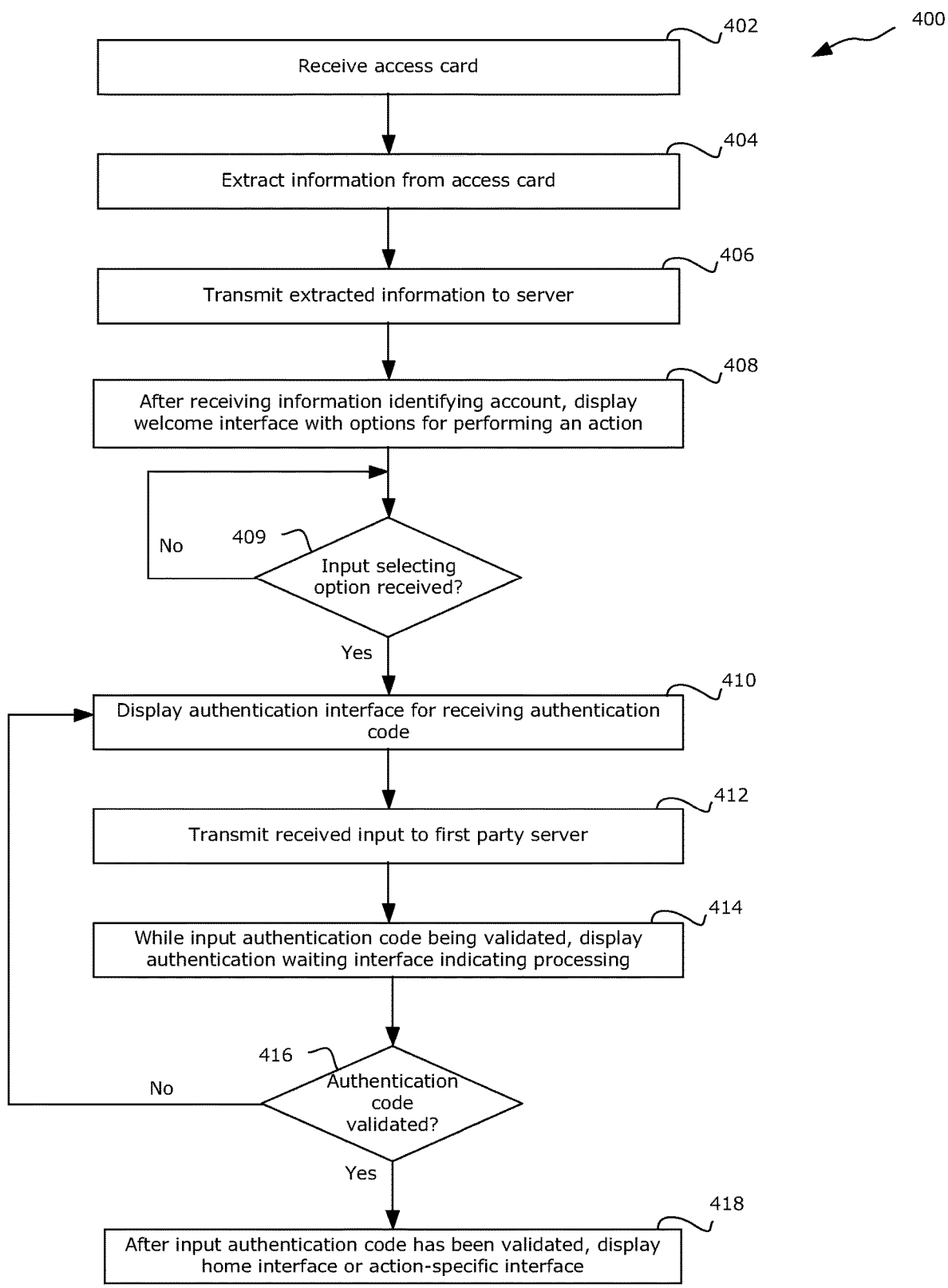
FIG. 4 is a flowchart illustrating a method for initiating a session at an automated device in accordance with example embodiments of the present disclosure.

FIG. 4 is a flowchart of an example method 400 for initiating a session on the automated device 100 in accordance with example embodiments of the present disclosure. The method 400 may be performed by the automated device 100 illustrated in FIG. 1, for example. For convenience, reference will be made to the automated device 100 illustrated in FIG. 1 although automated devices having different features may be used in other embodiments. The session is initiated to perform one or more actions using the automated device 100. In the present disclosure, the session is initiated to perform a data transfer using the automated device 100. A data transfer may involve transfer of data from a source account to a destination account. The source account and the destination account may be managed by a first-party service provider that also manages the automated device 100. The data transfer may involve sending and receiving data between a source account and a destination account, or transferring a data value from the source account to the destination account, which may include updating the source account to deduct (or debit) the data value and updating the destination account to add (or credit) the data value. The source account and destination accounts may be associated with, or managed by, the same or different data providers depending on the type of data transfer. The data transfer information, also known as provisioning data, specifies how to send and/or receive data transfers, including data transfer signals and other communications and any messages contained therein. The data transfers may comprise messages.

The data transfers, when comprising financial transactions, may comprise remittances in which case the data transfer information may comprise remittance data, for example, involve one or both of the first-party service provider and the third-party service provider. The remittances may be bill payments, bill payment instructions or electronic funds transfer instructions, in which case the data transfer information may comprise biller remittance data. Completion of a data transfer may involve reconciliation of accounts between respective backend servers of the first-party service provider and the third-party service provider.

At operation 402, an access card is received by the automated device 100 via the card slot 118.

At operation 404, the access card is processed by the automated device 100 via the card reader 112 to extract information stored on the access card. The information extracted from the access card may include information used to identify whether the access card is associated with an account that is managed by the first-party service provider (e.g., financial institution) that owns or operates the automated device 100.

At operation 406, the automated device 100 sends information extracted from the access card to a backend server, for example, a first-party server 306 owned or operated by the first-party service provider that owns or operates the automated device 100, to identify and/or retrieve information about one or more accounts associated with a user to whom the access card is assigned. When the first-party server 306 determines that the access card is not associated with an account that is managed by the first-party service provider, the first-party server 306 may further communicate with a service provider network to obtain account information from another service provider.

The first-party server 306 sends to the automated device 100 a signal providing information identifying the account(s) associated with the access card. The information provided by the first-party server 306 may include information indicating whether the access card is associated with an account that is managed by another service provider, for example.

Figure 7:
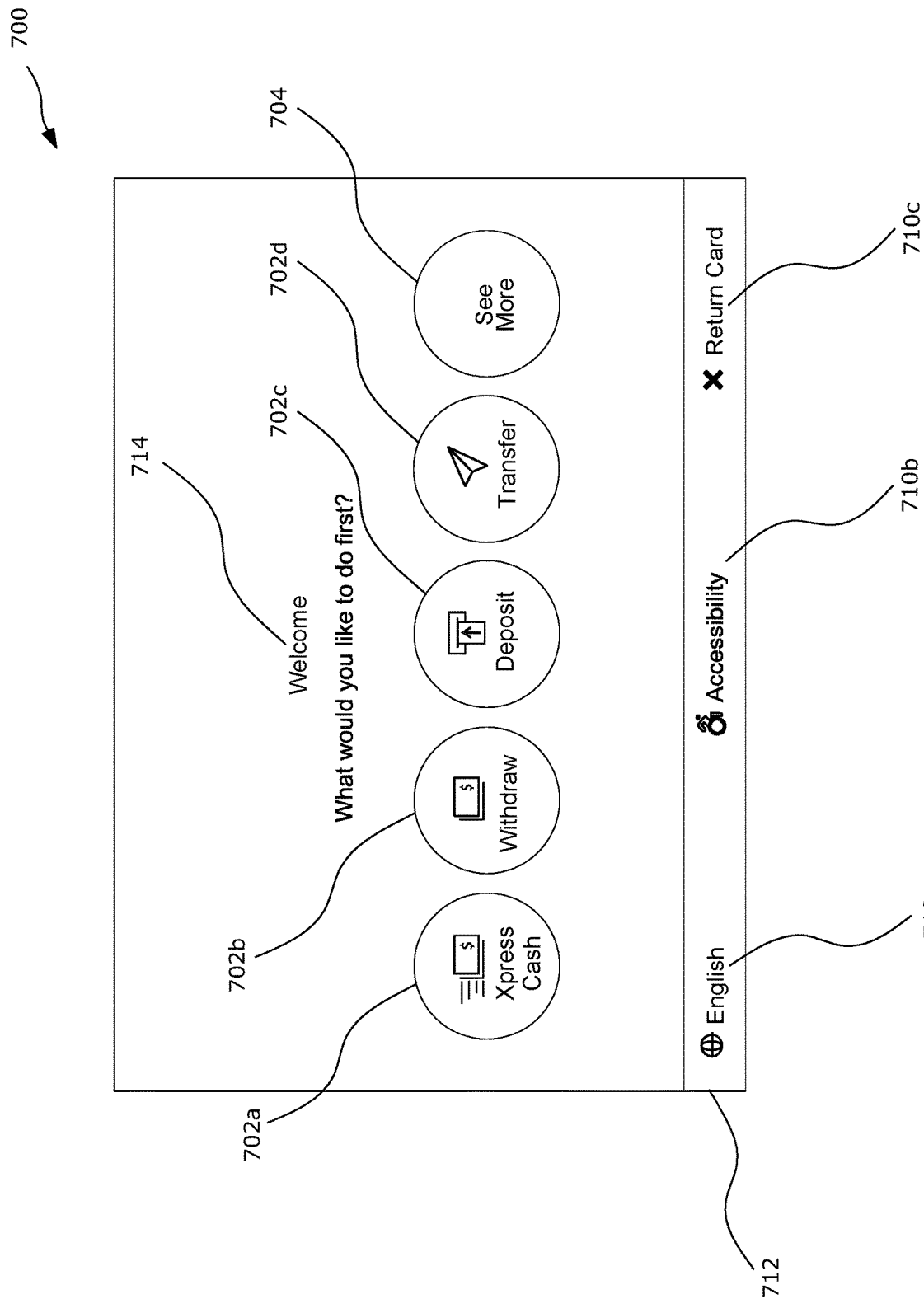
FIG. 7 is an example welcome interface in accordance with example embodiments of the present disclosure.

At operation 408, in response to receipt of the information from the first-party server 306, the automated device 100 displays the welcome interface 700 shown in FIG. 7. The welcome interface 700 includes a plurality of selectable options 702a-702d (generally referred to as options 702), which may be selected to initiate an action using the automated device 100. The options 702 displayed at the welcome interface 700 may be a subset of all available actions that may be performed using the automated device 100. In some examples, the options 702 displayed at the welcome interface 700 may depend on the capabilities of the automated device 100 and/or the actions that are permissible for the account(s), which are determined based on the inserted access card as described above. For example, if the account is not managed by the first-party service provider, the options 702 may be more limited than if the account is managed by the first-party service provider that owns the automated device 100. The provided options 702 may depend on the capabilities of the automated device 100, for example whether the automated device 100 is able to provide certain types of output (e.g., cash or foreign currency). The options 702 may also be dynamically modified based on the current state of the automated device 100. For example, the automated device may normally be capable of providing a certain type of output (e.g., cash) but may be in a current state in which that capability is not available (e.g., the automated device 100 has run out of cash).

The displayed selectable options 702 in FIG. 7 include an option 702a for providing express physical output (e.g., express withdrawal of cash), an option 702b for providing physical output (e.g., regular withdrawal of cash), an option 702c for providing physical input (e.g., deposit of cash and/or check), and an option 702d for performing a data transfer between first-party accounts. The welcome interface 700 also provides a selectable option 704 for displaying more available actions.

The welcome interface 700 in this example also includes selectable general options 710a-710c (generally referred to as general options 710). The general options 710 may include options concerning general operation of the automated device 100, and may not be related to any specific action or workflow performed using the automated device 100. In the shown embodiment of FIG. 7, the general options 710 are provided in a lower portion 712 of the welcome interface 700, for example, in bar, panel or frame at the bottom of the welcome interface 700. The general options 710 in this example include an option 710a for returning to a previous interface in the sequence of interfaces, an option 710b for displaying accessibility options, and an option 710c to cancel the current action (in this case, the exchange of data using physical input). In the shown embodiment of FIG. 7, the option 710a is displayed on the left side of the lower portion 712, the option 710b is displayed at the middle of the lower portion 712, and the option 710c is displayed on the right side of the lower portion 712. Other locations for the general options 710 may be used. The general options 710 may each be provided at the same location over a plurality of interfaces during the session, which may help a user to more easily find each of the general options 710. In particular, the location of the option 710b may enable a user with limited mobility and/or limited reach to more easily select the option 710b for displaying accessibility options.

The welcome interface 700 may also include a message 714. In the shown embodiment, the message is a greeting comprising the text "Welcome" and the "What would you like to do first?" In some examples, the greeting 714 may include non-sensitive customized information based on account information, such as a name associated with the account. Such customized information may be obtained via communication between the automated device 100 and the first-party server 306. For example, such information may be provided to the automated device 100 together with identification of the account(s) associated with the access card.

At operation 409, the automated device 100 monitors for selection of one of the options 702, 704 in the welcome interface 700.

Figure 8:
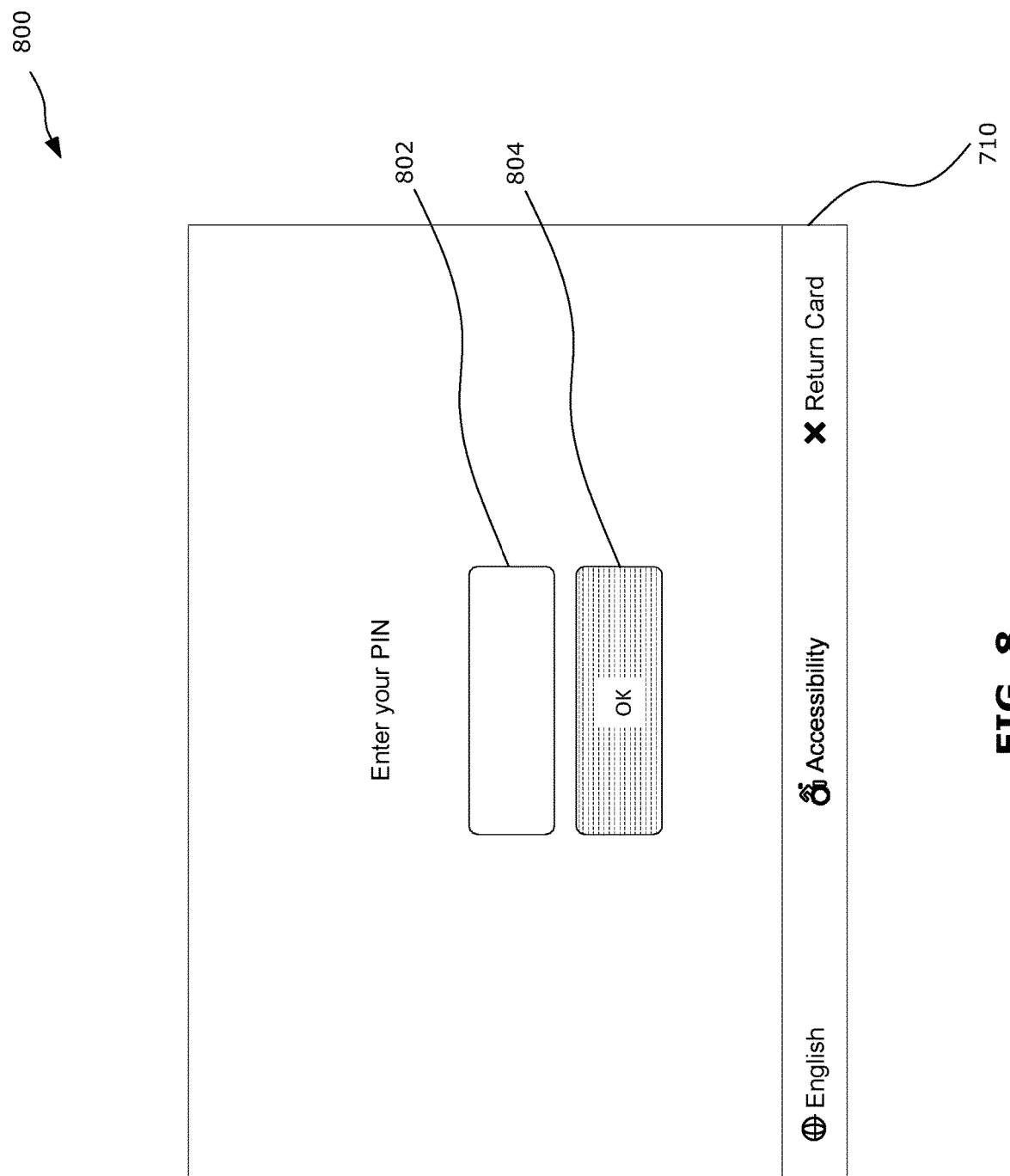
FIG. 8 is an example authentication interface in accordance with example embodiments of the present disclosure.

At operation 410, directly in response to selection of one of the options 702, 704, the automated device 100 proceeds to display the authentication interface 800 of FIG. 8 (also be referred to as the authentication code entry screen or PIN entry screen). The authentication interface 800 enables receipt of input of an authentication code associated with the account.

The authentication interface 800 provides an input field 802 for entry of an authentication code (e.g., PIN) associated with the account (e.g., as identified via the inserted access card). When multiple accounts are associated with the access card, the same authentication code may be used for all of the accounts. In this sense, the authentication code may also be considered to be an authentication code that has been set for the access card. For example, a user may use the keypad 104 of the automated device 100 to provide input into the input field 802. The keypad 104 may also provide the ability to backspace or cancel input. Other input mechanisms may also be used. The authentication interface 800 provides a confirmation button 804 to confirm entry of the authentication code. The authentication interface 800 also provides the general options 710 as discussed above. When the confirmation button 804 is selected, the input into the input field 802 is received by the automated device 100. In some examples, instead of selecting the confirmation button 804, the user may use a physical button (e.g., a physical confirmation button or "OK" button, which may be part of the keypad 104) to confirm entry of the authentication code. Input using a physical confirmation button may be interpreted to be selection of the confirmation button 804. It should be generally understood that, in the present disclosure, selection of any confirmation button may be alternatively input using a physical confirmation button, such as an "OK" button on the keypad.

At operation 412, the automated device 100 sends the received input to the first-party server 306 for validation of the input authentication code.

At operation 414, while the first-party server 306 performs validation, the automated device 100 may display the authentication waiting interface 900 of FIG. 9 (also referred to as the authentication processing screen) after receiving the input via the authentication interface 800 and before a response signal is received from the first-party server 306.

The authentication waiting interface 900 in this embodiment includes an animation 902 to indicate processing. Other indicators, with or without animation, may be used in other embodiments. The authentication waiting interface 900 in this embodiment also displays information 904. The displayed information 904 may or may not be related to the current action being performed, may or may not be specific to the account, and may or may not be specific to the associated service provider.

The information 904 may be used to inform the user of features and options provided by the automated device 100 and/or service provider associated with the automated device 100. This may enable new features/options, useful features/options or rarely used features/options to be brought to the user's attention. The information 904 may also provide general user appreciation information, marketing information, or other customized or non-customized information. In some examples, the information 904 may provide customized information, for example customer appreciation information associated with the account, or marketing information customized to the account. Such customized information may be dynamically generated, based on account information provided by the server. In some examples, the information 904 may include dynamic information (e.g., time of day, current temperature, etc.) which may be updated by the automated device, or may be provided to the automated device by the first-party server. The authentication waiting interface 900 may be omitted in other embodiments in which the processing or waiting time is negligible.

At operation 416, the first-party server 306 performs validation, for example by comparing the received input to an authentication code associated with the account. If the validation is successful (i.e., the received input matches the authentication code associated with the account), the first-party server 306 sends a signal to the automated device 100 to indicate that validation is successful. If the validation is not successful (i.e., the received input does not match the authentication code associated with the account), the first-party server 306 sends a signal to the automated device 100 to indicate that validation failed.

If validation failed, the automated device 100 may generate output (e.g., a visual display) to indicate that the received input does not match the authentication code associated with the account. The automated device 100 may again display the authentication interface 800 for the user to re-enter the authentication code.

At operation 418, in response to receipt a signal from the first-party server 306 that the input received at operation 410 is validated, the automated device 100 proceeds to display the home interface 1000 of FIG. 10A discussed further below when option 704 is selected from the welcome interface 700 or an action specific interface, such as the source selection interface 1100 of FIG. 11A associated with a data transfer when the option 702d is selected from the welcome interface 700.

Figure 5A:
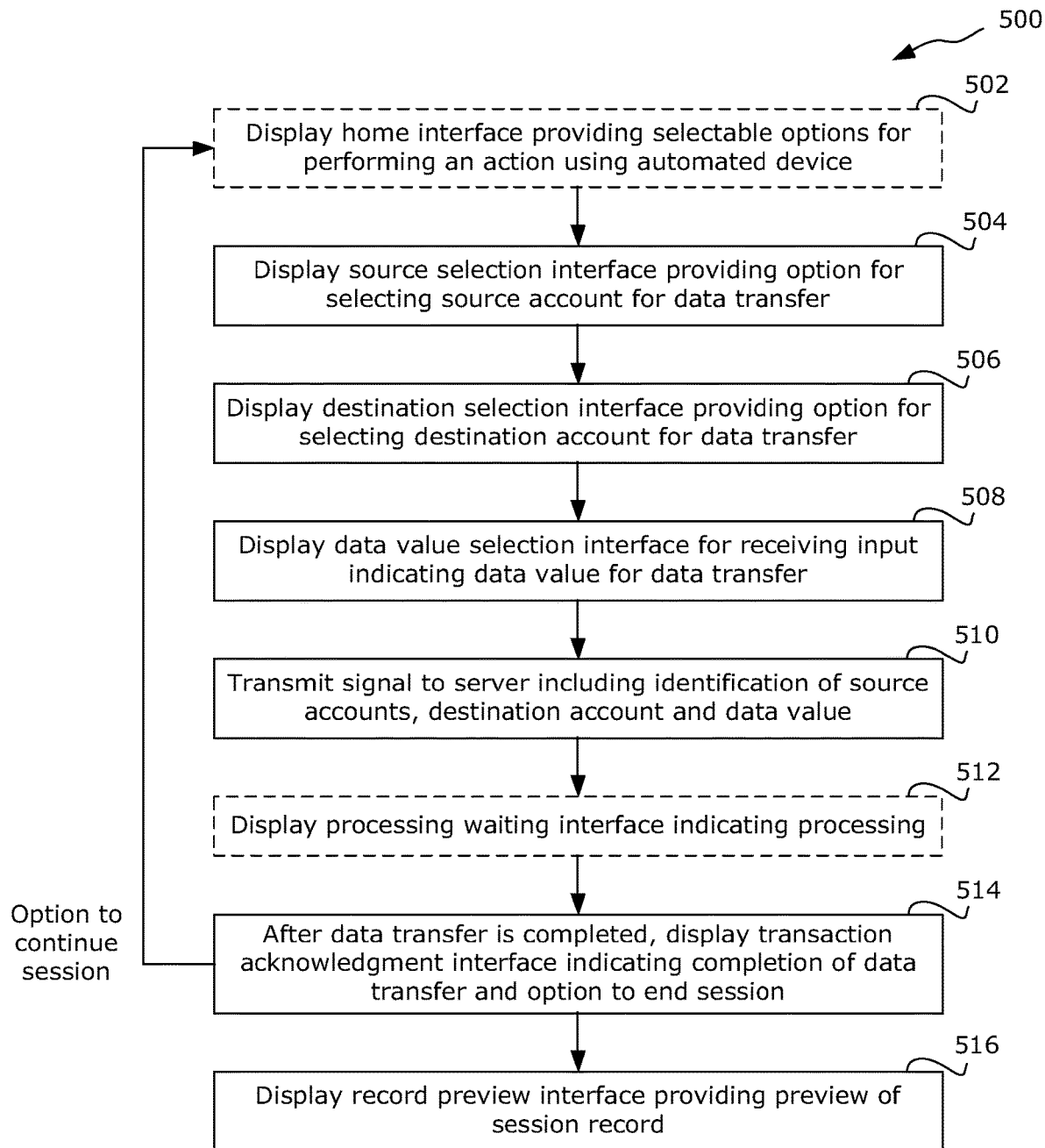
FIGS. 5A and 5B are flowcharts illustrating methods for performing a data transfer at an automated device in accordance with example embodiments of the present disclosure.

FIG. 5A is a flowchart of a method 500 for performing a data transfer at an automated device in accordance with example embodiments of the present disclosure. The method 500 may follow the method 400 described above. The method 500 may be performed by the automated device 100 illustrated in FIG. 1, for example. For convenience, reference will be made to the automated device 100 illustrated in FIG. 1 although automated devices having different features may be used in other embodiments.

Figure 10A:
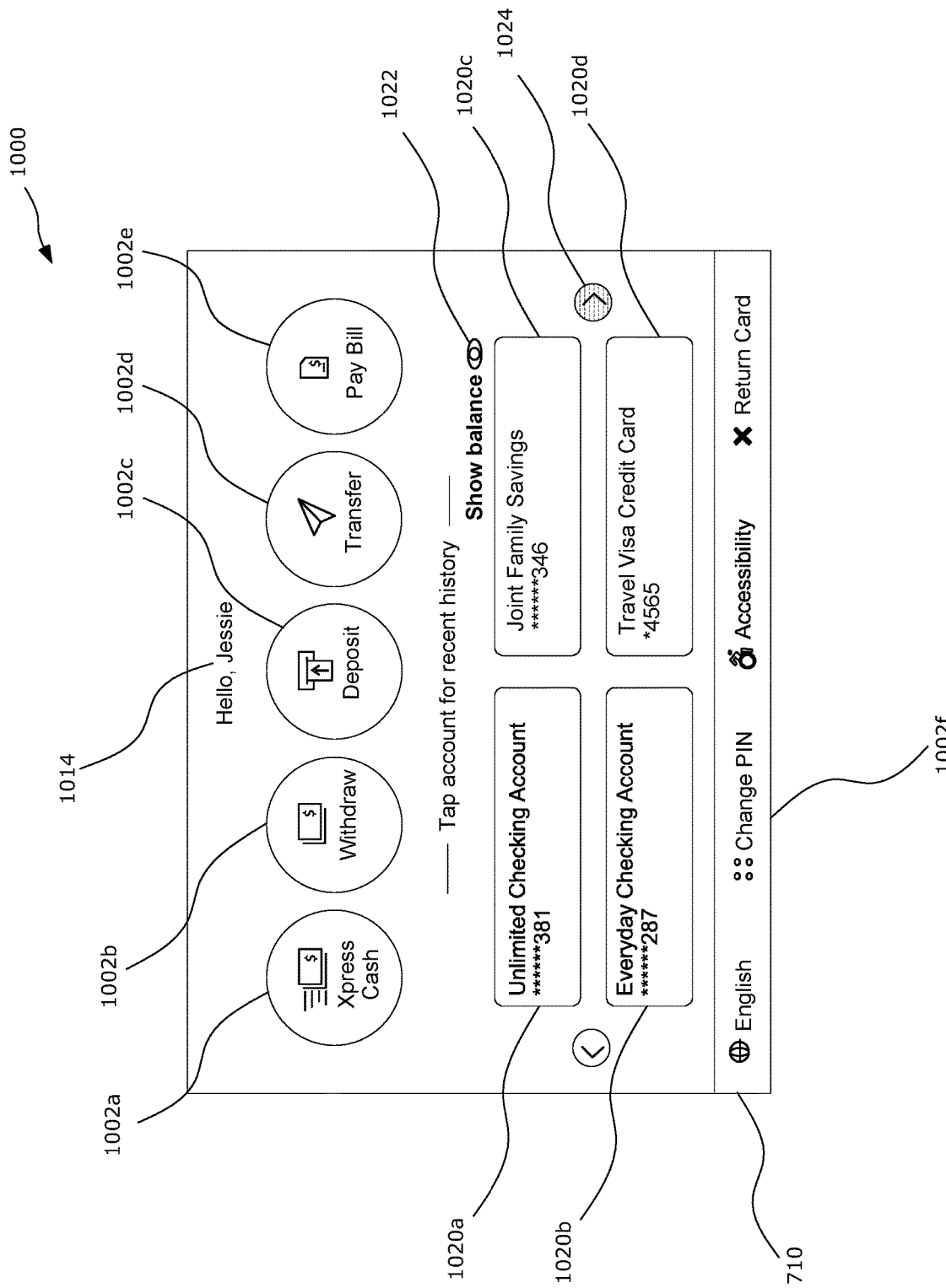
FIG. 10A is a home interface that provides options for performing an action using the automated device in accordance with example embodiments of the present disclosure.

At operation 502, the automated device 100 displays the home interface 1000 of FIG. 10A (also referred to as the main interface). The home interface 1000 is displayed directly from the authentication screen 800 or authentication waiting screen 900 in response to selection of the selectable option 704 for displaying more available actions on the welcome interface 700. This operation is optional. When one of the selectable options 1002 is selected on the welcome interface 700 rather than the selectable option 704, the operation 502 and the display the home interface 1000 is skipped and an action-specific interface corresponding to the selected selectable option 702 is displayed directly from the authentication screen 800 or authentication waiting screen 900 in response to selection of the corresponding selectable option 702, such as the source selection interface 1100 of FIG. 11A associated with a data transfer when the option 702d is selected from the welcome interface 700.

The home interface 1000 provides a plurality of selectable options 702 as discussed below, each selectable option being selectable for example by interacting with a touchscreen and/or a keypad 104 of the automated device 100. The home interface 1000 provides a plurality of selectable options 1002a-1002f for performing an action using the automated device 100. The action may be performed in the context of a selected account. The selected account may be selected from one or more accounts identified via an access card inserted into the automated device 100. The account may be a user account that is managed by the first-party service provider (e.g., financial institution) that is associated with the automated device 100.

The selectable options 1002 are similar to the options 702 provided by the welcome interface 700 of FIG. 7 but include additional options not displayed in the welcome interface 700. The selectable options 1002 involve exchanging or updating data contained in the account and managed by the service provider. One or more of the selectable options 1002 may involve accepting physical input(s) and/or providing physical output(s) in addition to the exchange of data. The selection options 1002 may also include one or more options for transferring data between accounts, including between two first-party accounts managed by the same first-party service provider, or between a first-party account and a third-party account that is managed by a third-party service provider.

In this example, the selectable options 1002 include an option 1002a for providing express physical output (e.g., express withdrawal of cash), an option 1002b for providing physical output (e.g., regular withdrawal of cash), an option 1002c for providing physical input (e.g., a deposit of cash and/or check), an option 1002d for performing a transfer (e.g., of data or funds) between first-party accounts, an option 1002e for performing a data transfer to a third-party account, and an option 1002f for changing an authentication code (e.g., a PIN) associated with the account. The home interface 1000 also includes general options 710 as discussed above.

Optionally, the home interface 1000 may include a greeting 1014. In some examples, the greeting 1014 may include non-sensitive personalized information, such as a name associated with the user account. As discussed above, such customized information may be dynamically generated using information received from the server.

The home interface 1000 also displays one or more selectable account options 1020a-1020d (generally referred to as account option 1020) for selecting an account that has been identified, for example via the inserted access card and via communications with the first-party server 306 as discussed above. There may be a plurality of accounts associated with the access card, each of which may be associated with different data and which may be used for performing different data exchange actions. Each account option 1020 may provide some identifying information about the account associated with the respective option, but the identifying information may be at least partially protected (e.g., using * symbols) to avoid sensitive information being inadvertently exposed. In this example, the account options 1020 include options 1020a and 1020b to select a checking account, an option 1020c to select a savings account, and an option 1020d to select a credit card account.

Figure 10B:
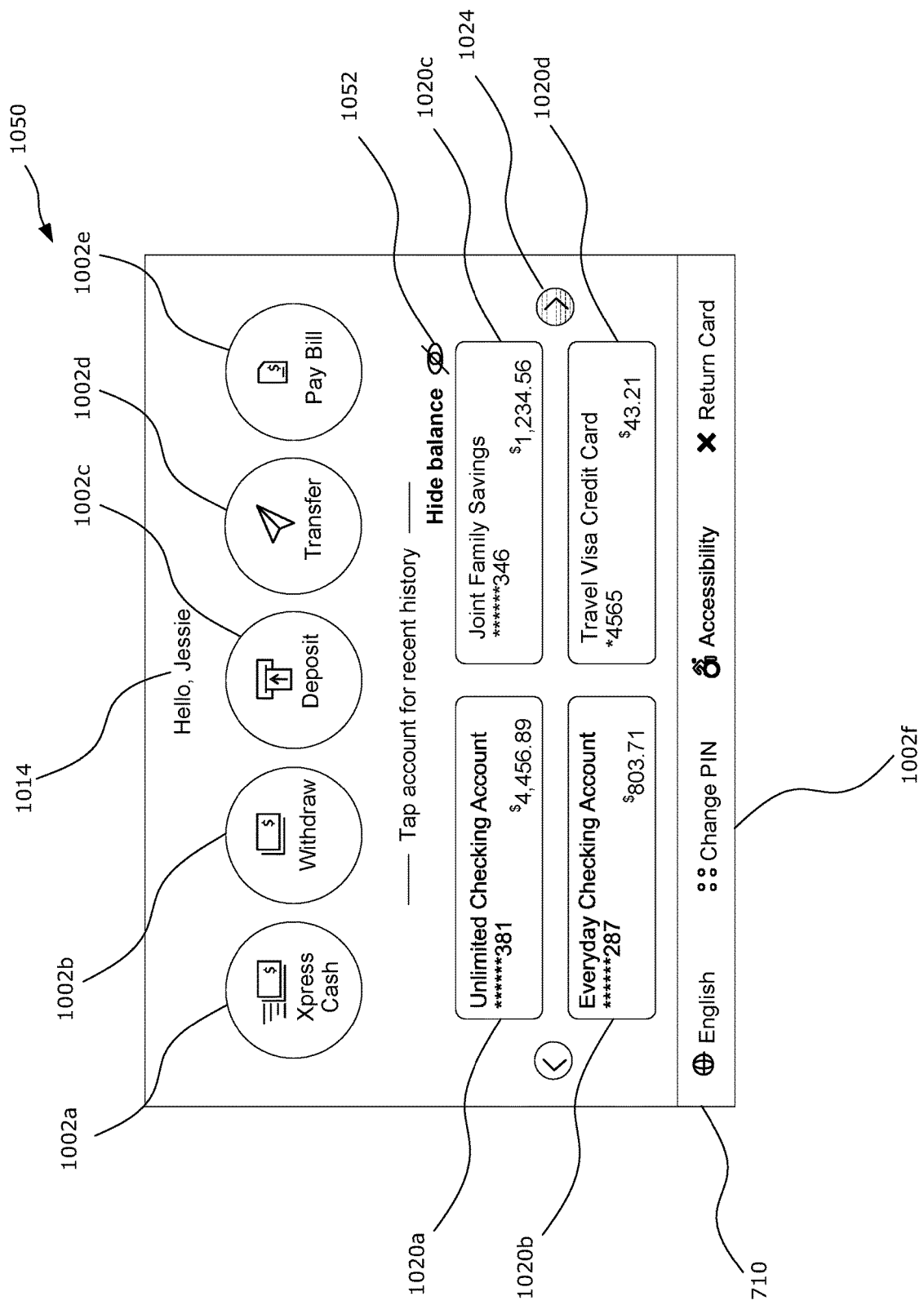
FIG. 10B is an alternate home interface showing the current states of selectable accounts in accordance with example embodiments of the present disclosure.

Each account option 1020 may be selectable to display further information (e.g., recent data history such as recent exchanges of data on that account) about the individual account associated with the selected option 1020 and/or to initiate an action for that individual account. In the shown embodiment, the home interface 1000 provides a selectable option 1022 to display further information about all the accounts associated with the displayed account options 1020. For example, the selectable option 1022 may be selected to cause the account options 1020 to display the current state (e.g., current balance) of each associated account. In the shown example, the selectable option 1022 comprises the message "Show balance" and a representative icon or other visual indicator to provide visual cue to users. The further information may be received from the first-party server 306. The information may be dynamically received, for example in response to a selection of the selectable option 1022. In this way, the user may be provided with real-time, customized information. In this example, selecting the selectable option 1022 causes the alternate home interface 1050 of FIG. 10B to be displayed. The alternate home interface 1050 is similar to the home interface 1000, and the two home interfaces 1000, 1050 have common visual elements. The home interface 1050 may be considered a sub-screen, a variation or a transition of the home interface 1000. Thus, in some cases, the home interface 1000 and the home interface 1050 may be considered to be the same interface.

The home interface 1050 provides further information about the accounts associated with the selectable options 1020. For example, the automated device 100 may query the first-party server 306 to obtain further information for the accounts to dynamically generate the home interface 1050. The automated device 100 may send a signal to the first-party server 306 indicating the account(s) (e.g., including an identifier for the account(s)) for which further information is requested. In response, the first-party server 306 may send a signal to the automated device 100 providing current information about the account(s), such as the current state (e.g., current balance) of the account(s). In this way, the automated device 100 may dynamically generate the home interface 1050 to provide current information about the selected account in real-time.

In the home interface 1050, each selectable option 1020 is modified to include a visual indication of the current state of the respective associated account (e.g., shows the numerical current balance in each account), and the selectable option 1022 is replaced by a selectable option 1052 to hide the further information (e.g., current state of each account). In the shown example, the selectable option 1052 comprises the message "Hide balance" and a representative icon or other visual indicator to provide visual cue to users. The selection of options 1022, 1052 may enable a user to toggle or switch between the home interfaces 1000, 1050. Generally, the selectable options and functions available at the home interface 1000 are the same as at the home interface 1050 with the exception of the selectable options 1022, 1052.

When the number of accounts that have been identified for the access card exceeds the number of displayable selectable options 1020, the home interfaces 1000, 1050 provide scroll options 1024 to scroll to display additional account options associated with additional accounts.

The information displayed for the selectable options 1020 (e.g., identification of the associated accounts and, in the home interface 1050, further information about the current state of each account) may be dynamically provided by the first-party server 306. For example, the automated device 100 may query the first-party server 306 in real-time (e.g., in response to selection of the option 1022) to obtain the account information to be displayed. Thus, the options 1020 may be customized in real-time to provide information that is relevant to the current user, current action and current session at the automated device 100.

Figure 11A:
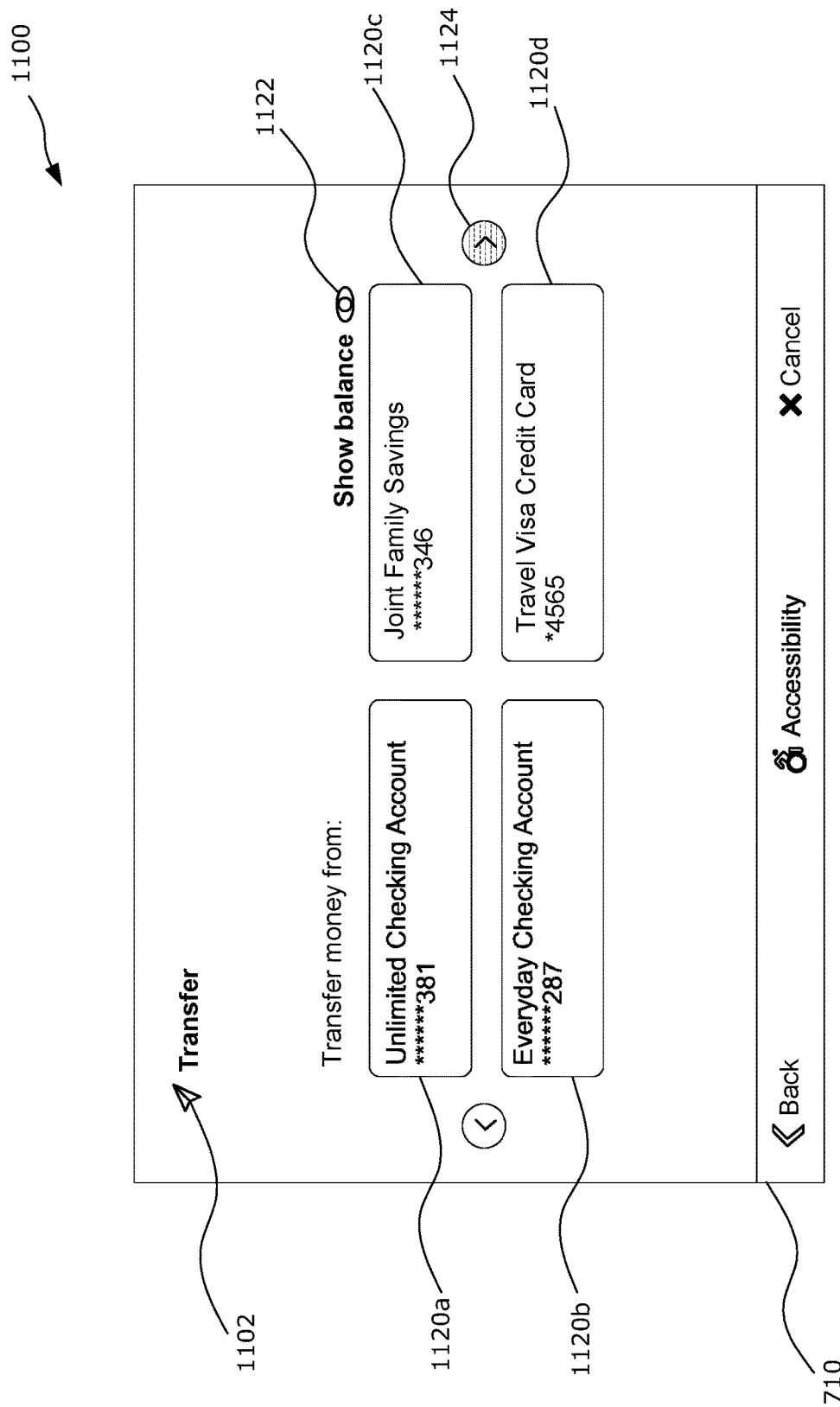
FIG. 11A is a source selection interface providing options for selecting a destination account for a data transfer in accordance with example embodiments of the present disclosure.

Next, the method 500 proceeds directly to operation 504 in response to selection of the option 1002d for performing a data transfer in which the automated device 100 displays the source selection interface 1100 of FIG. 11A. Alternatively, the source selection interface 1100 may be displayed directly from the authentication screen 800 or authentication waiting screen 900 in response to selection of the selectable option 702d for performing a transfer (e.g., of data or funds) between first-party accounts on the welcome interface 700.

The source selection interface 1100 includes a visual context indicator 1102 indicating that the source selection interface 1100 is in the context of performing a data transfer in accordance with the selection of the option 702d or the 1002d in the preceding welcome interface 700 or home interface 1000,1050. The visual context indicator 1102 comprises an icon and text label indicating that the source selection interface 1100 is in the context of performing a data transfer in the shown embodiment. The source selection interface 1100 provides one or more selectable options 1120a-1120d (generally referred to as options 1120) for selecting a source account for the data transfer. The account options 1120 are dynamically populated with information received from the first-party server 306, similar to the account options 1020 as discussed above. The source selection interface 1100 also includes general options 710 as discussed above. The source selection interface 1100 also provides a selectable option 1122 to display further information about all the accounts associated with the displayed account options 1120. For example, the selectable option 1122 may be selected to cause the account options 1120 to display the current state (e.g., current balance) of each associated account. In the shown example, the selectable option 1122 comprises the message "Show balance" and a representative icon or other visual indicator to provide visual cue to users.

Figure 11B:
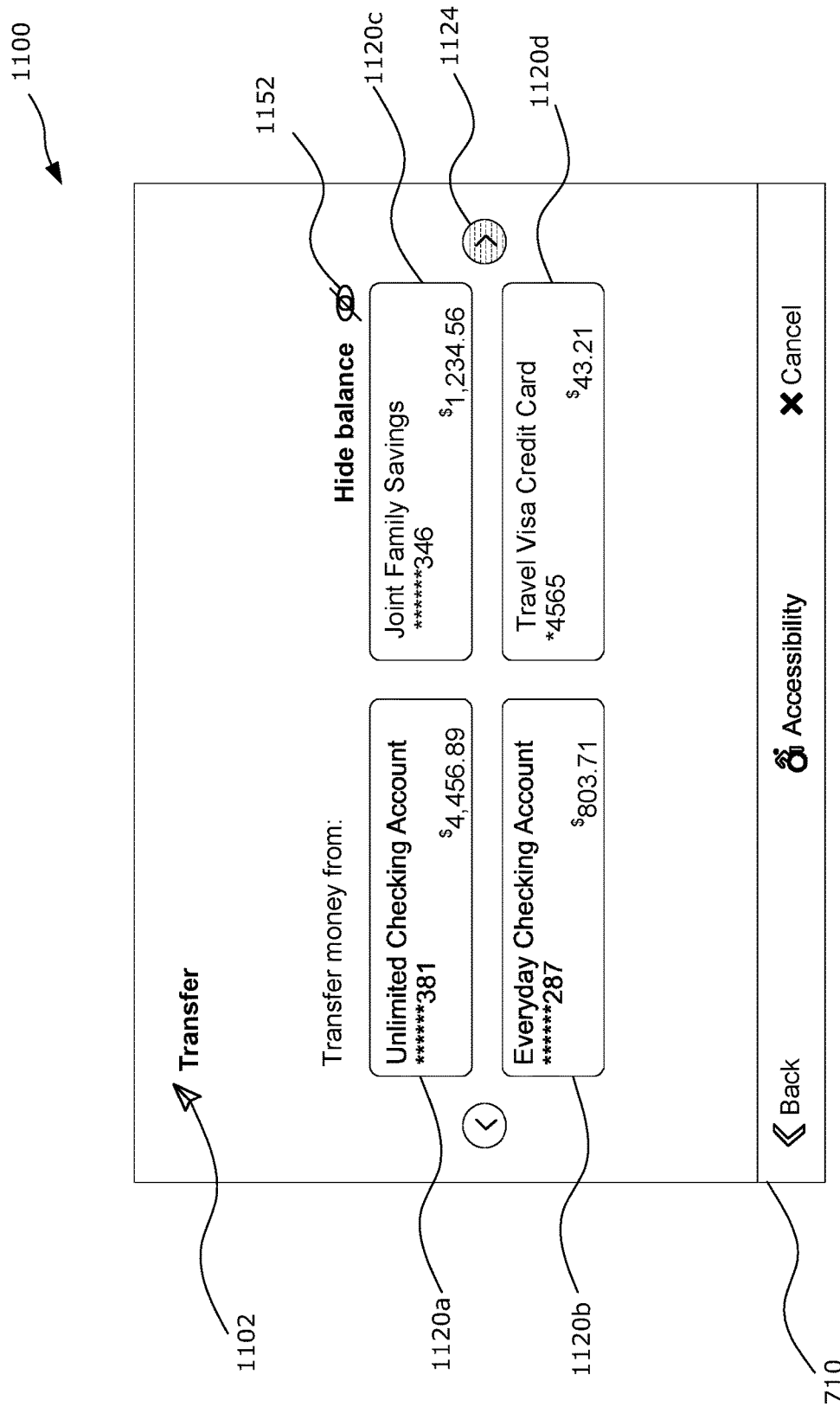
FIG. 11B is an alternate source selection interface showing information about historical data transfers in accordance with example embodiments of the present disclosure.

In this example, selecting the selectable option 1122 causes the alternate source selection interface 1150 of FIG. 11B to be displayed. The alternate source selection interface 1150 is similar to the source selection interface 1100, and the two source selection interfaces 1100, 1150 have common visual elements. The source selection interface 1150 may be considered a sub-screen, a variation or a transition of the source selection interface 1100. Thus, in some cases, the source selection interfaces 1100 and the source selection interface 1150 may be considered to be the same interface. The source selection interface 1150 may be dynamically generated using information received from the first-party server 306, similar to the manner in which the alternate home interface 1050 may be dynamically generated, as discussed above. In this way, the automated device 100 may dynamically generate the source selection interface 1150 to provide current information about possible source accounts in real-time.

In the source selection interface 1150, each account option 1120 is modified to include a visual indication of the current state of the respective associated account (e.g., shows the numerical current balance in each account), and the option 1122 is replaced by an option 1152 to hide the further information (e.g., current state of each account). In the shown example, the selectable option 1152 comprises the message "Hide balance" and a representative icon or other visual indicator to provide visual cue to users. Selection of selectable options 1122 and 1152 may enable a user to toggle or switch between the source selection interfaces 1100 and 1150. Generally, the options and functions available at the source selection interface 1100 are the same at the source selection interface 1150, with the exception of the options 1122, 1152.

When the number of accounts that have been identified for the access card exceeds the number of displayable selectable options 1120, the source selection transfer interfaces 1100, 1150 also provides scroll options 1124 to scroll to display additional account options associated with additional accounts. The destination selection interface 1200 also includes general options 710 as discussed above.

Figure 5B:
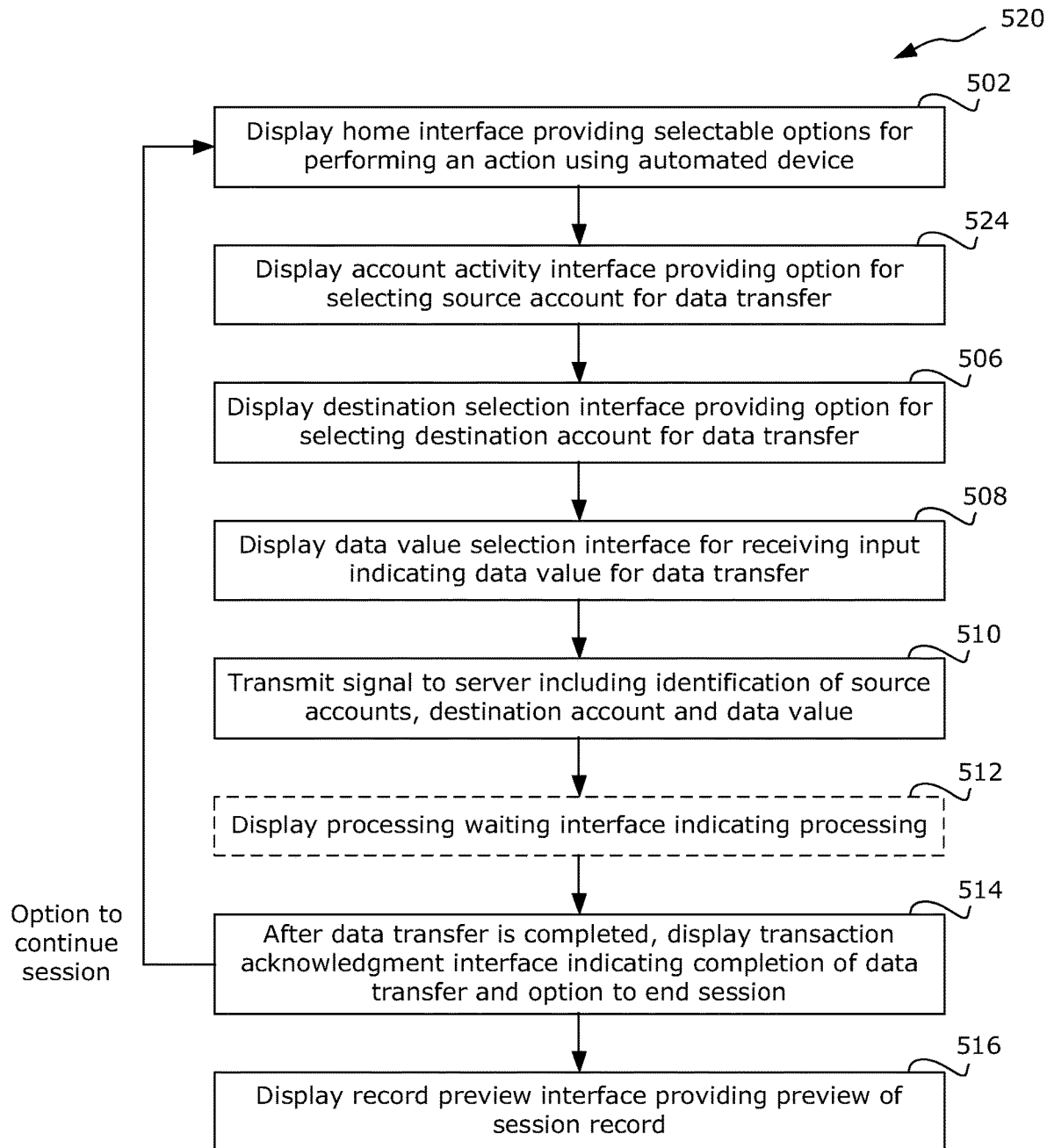

Referring briefly to FIG. 5B, an alternative method 520 will be briefly described. The method 520 is similar to the method 500 with the exception that the home interface 1000 is displayed directly from the authentication screen 800 or authentication waiting screen 900 in response to selection of the selectable option 704 for displaying more available actions on the welcome interface 700. There is no operation to skip the home interface 700 by selecting the operation 702d from the welcome interface 700. Moreover, rather than selecting rather than proceeding directly to operation 504 from operation 502 in response to selection of the option 1002d for performing a data transfer from the home interface, the method 520 proceeds directly to operation 524 in response to selection of an account option 1020 in the home interface 1000 in which the automated device 100 displays the account activity interface 1180 of FIG. 11C. In the shown embodiment, the account activity interface 1180 is for the account designated "Joint Family Savings" and is invoked by selecting the account option 1020c in the home interface 1000.

The account activity interface 1180 includes a visual context indicator 1182 indicating that the account activity interface 1180 is in the context of the particular selected account. The account activity interface 1180 also provides information about the selected account, such as information 1104 indicating the current state of the account (e.g., current amount of funds held in the account) and information 1106 including a listing of recent exchanges of data performed for the account. A scroll button 1108 may be provided to enable viewing of additional information 1106.

The account activity interface 1180 includes a selectable option 1110 to provide output (e.g., a physical printed output, or an electronic output) showing the information 1106. The account activity interface 1100 also includes selectable options 1112a-1112c (generally referred to as options 1112) for updating the selected account. The options 1112 may be a subset of the selectable options 1002 provided at the home interface 1000 of FIG. 10A. In the example shown, the options 1112 include an option 1112a for providing physical output, an option 1112b for providing physical input, and an option 1112c for performing a transfer (e.g., of data or funds) between from the selected account to another first-party account. The account activity interface 1180 also includes general options 710 as discussed above.

Figure 11C:
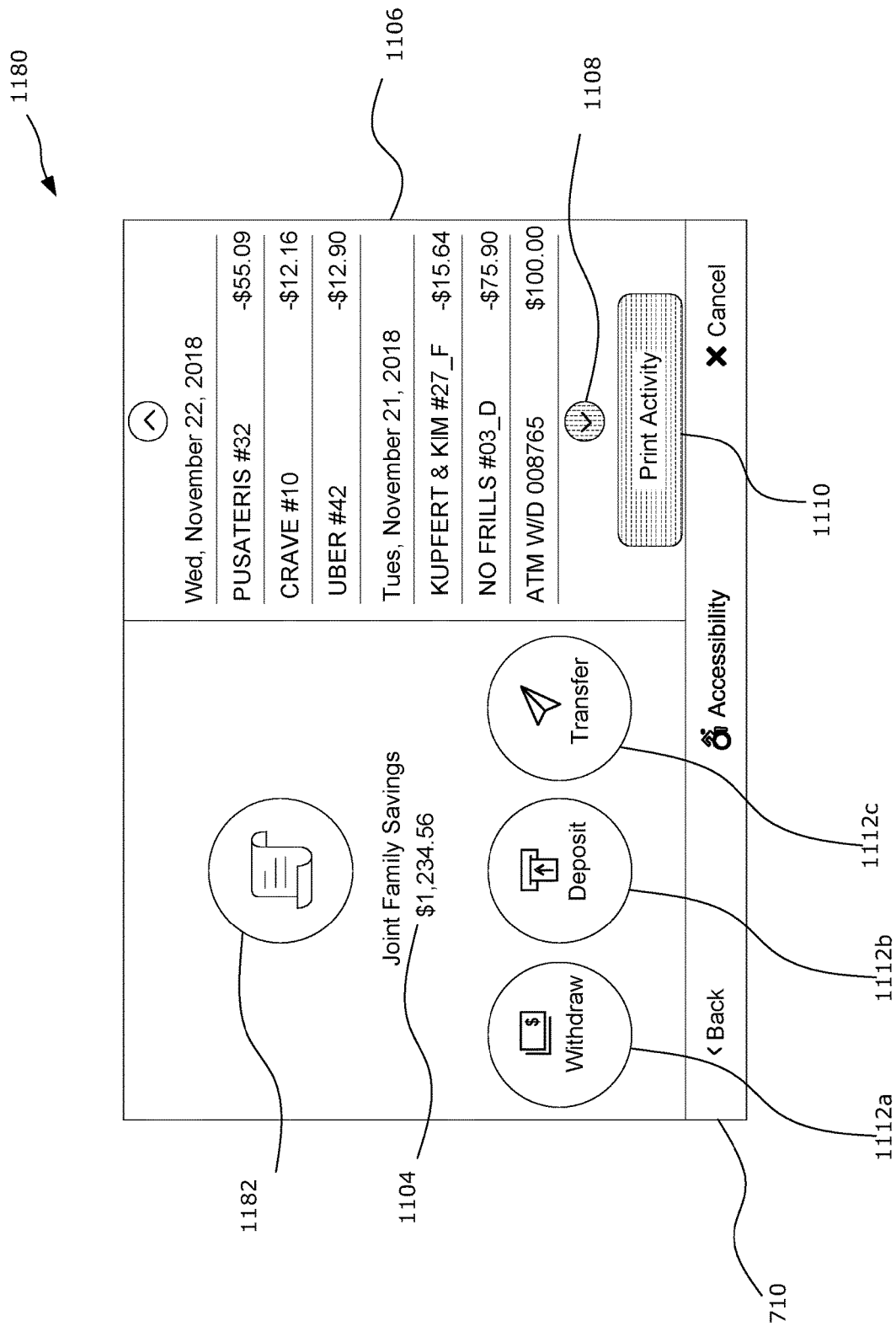
FIG. 11C is an account activity interface showing information about historical data transfers in accordance with example embodiments of the present disclosure.
Figure 12A:
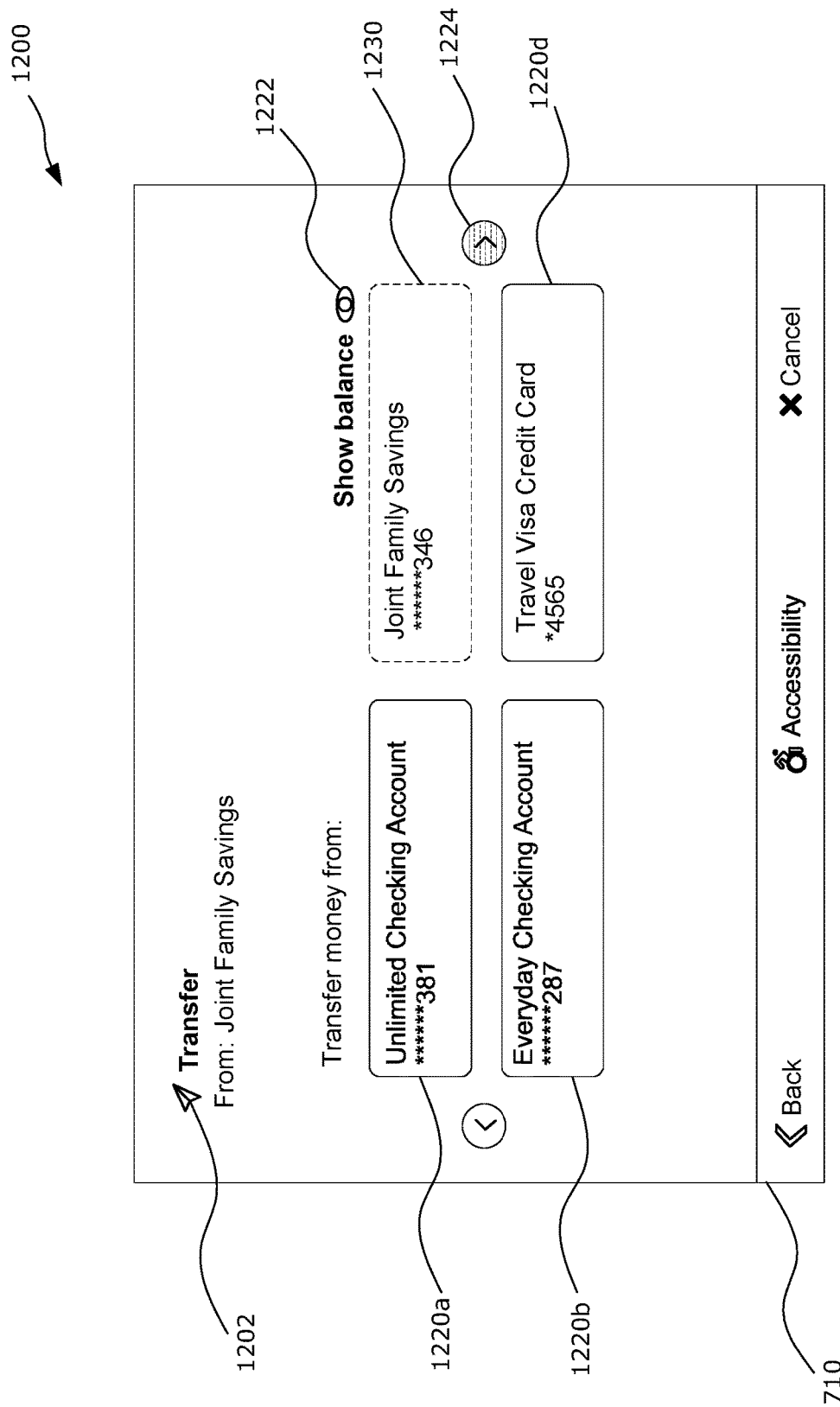
FIG. 12A is a destination selection interface that provides options for selecting a source account for a data transfer in accordance with example embodiments of the present disclosure.

Next, the method 500 proceeds directly to operation 506 in response to selection of an option 1120 for the source account for performing a data transfer in which the automated device 100 and displays the destination selection interface 1200 of FIG. 12A, or in response to selection of an option 1112c for performing a transfer (e.g., of data or funds) to another first-party account in the account activity interface 1180 of FIG. 11C. The destination selection interface 1200 includes a visual context indicator 1202 indicating that the destination selection interface 1200 is in the context of performing a data transfer in accordance with the selection of an option 1120 in the preceding source selection interfaces 1100, 1150. The visual context indicator 1202 comprises an icon and text label indicating that the destination selection interface 1200 is in the context of performing a data transfer in the shown embodiment. The visual context indicator 1202 also includes an identification of the source account selected in the source selection interface 1100, 1150, for example, in the form of a text label. The destination selection interface 1200 provides one or more selectable options 1220a-1220d (generally referred to as options 1220) for selecting a destination account to receive the data transfer. The destination accounts are first-party accounts managed by the same first-party service provider that operates the automated device 100. The selectable options 1220 are dynamically populated with information about possible first-party destination accounts, similar to the account options 1020, 1120 as discussed above. Information about possible destination accounts may be received from the first-party server 306. The information may be dynamically received from the first-party server 306 so that the selectable options 1220 may be populated with possible destination accounts in real-time and dependent on the user.

In the shown embodiment, the source account selected in the preceding operation via the source selection interface 1100, 1150 or account activity interface 1180 is shown by a visual context indicator 1230 which may take one of several different forms. The visual context indicator 1230 is not selectable. In the shown embodiment, the visual context indicator 1230 comprises a user interface element, such as an onscreen button, having the same shape as the selectable account options 1220 but is not selectable. In addition, the appearance of the visual context indicator 1230 is changed relative to the user interface element of the selectable account options 1220 (e.g., the color of the onscreen button is changed to indicate the selected source account). The visual context indicator 1230 may include account information of the same type as the selectable account options 1220 even though it is not selectable. In other embodiments, the size and/or shape of the onscreen button may be changed relative to the onscreen buttons for the selectable account options 1220, for example the onscreen button associated with the selected source account may be enlarged in addition to, or instead of, the color change. In yet other embodiments, the text of the account information contained inside the onscreen button may be changed in addition to, or instead of, the onscreen button itself. The visual context indicator 1230 provides a visual cue (e.g., visual affordance, guidance or nudge) as to the selected source account and provides the user with an opportunity to identify an error in the source account selection. In other embodiments, the visual context indicator 1230 may be omitted and the selected source account may not be presented in the destination selection interface 1200.

The destination selection interface 1200 also includes general options 710 as discussed above. The destination selection interface 1200 also provides a selectable option 1222 to display further information about all the accounts associated with the displayed options 1220. For example, the selectable option 1222 may be selected to cause the account options 1220 to display the current state (e.g., current balance) of each associated account. In the shown example, the selectable option 1222 comprises the message "Show balance" and a representative icon or other visual indicator to provide visual cue to users.

Figure 12B:
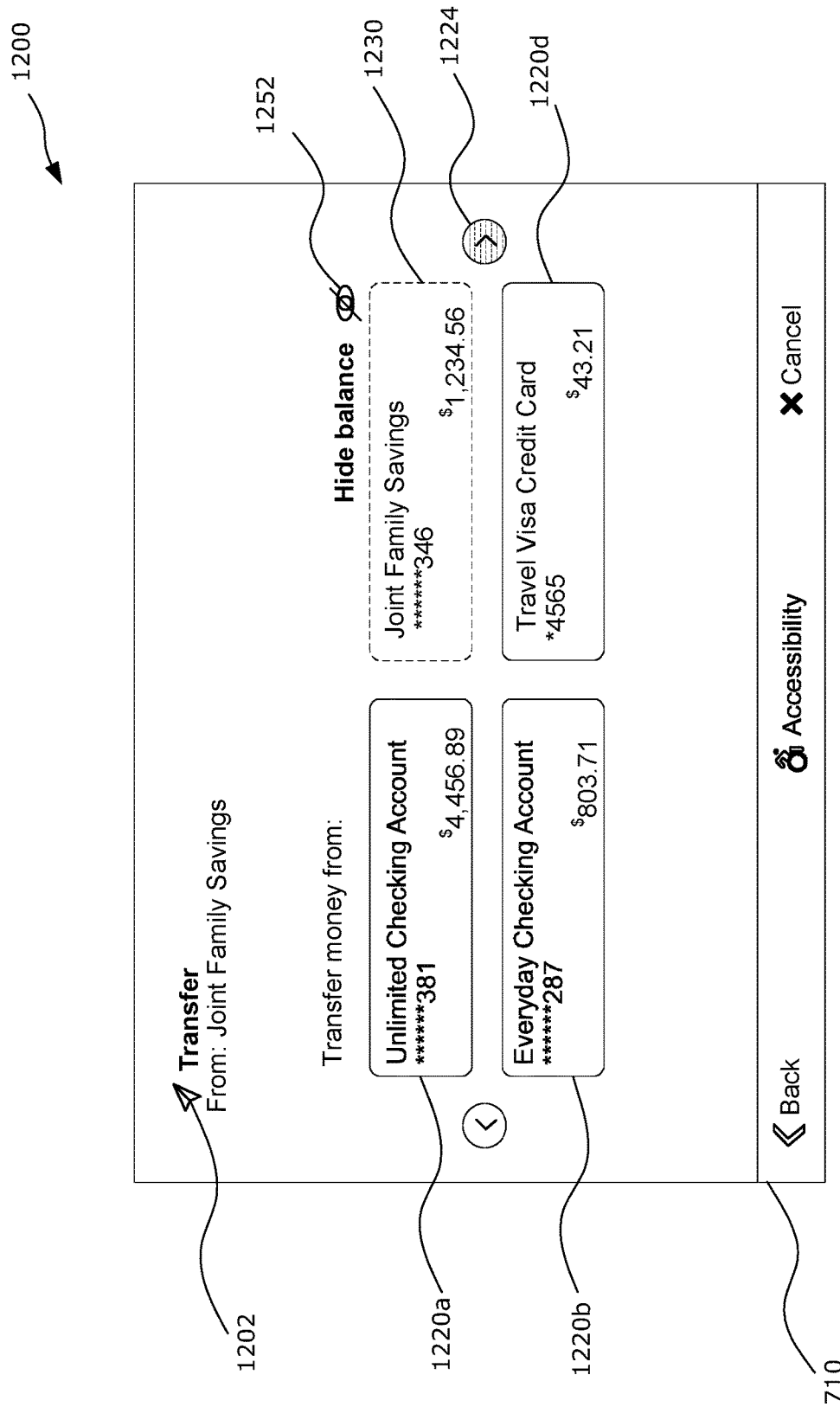
FIG. 12B is an alternate destination selection interface showing the current states of selectable accounts in accordance with example embodiments of the present disclosure.

In this example, selecting the selectable option 1222 causes the alternate destination selection interface 1250 of FIG. 12B to be displayed. The alternate destination selection interface 1250 is similar to the destination selection interface 1200, and the two destination selection interfaces 1200, 1250 have common visual elements. The destination selection interface 1250 may be considered a sub-screen, a variation or a transition of the destination selection interface 1200. Thus, in some cases, the destination selection interface 1200 and the destination selection interface 1250 may be considered to be the same interface. The destination selection interface 1250 may be dynamically generated using information received from the first-party server 306, similar to the manner in which the alternate source selection interface 1150 and home interface 1050 may be dynamically generated, as discussed above. In this way, the automated device 100 may dynamically generate the destination selection interface 1250 to provide current information about possible source accounts in real-time.

In the destination selection interface 1250, each account option 1220 is modified to include a visual indication of the current state of the respective associated account (e.g., shows the numerical current balance in each account), and the option 1222 is replaced by an option 1252 to hide the further information (e.g., current state of each account). In the shown example, the selectable option 1252 comprises the message "Hide balance" and a representative icon or other visual indicator to provide visual cue to users. Selection of selectable options 1222 and 1252 may enable a user to toggle or switch between the destination selection interfaces 1200 and 1250. Generally, the options and functions available at the destination selection interface 1200 are the same at the destination selection interface 1250, with the exception of the options 1222 and 1252.

When the number of destination accounts that have been identified for the access card exceeds the number of displayable selectable options 1220, the destination selection transfer interfaces 1200, 1250 also provide scroll options 1224 to scroll to display additional account options associated with additional accounts.

Figure 13:
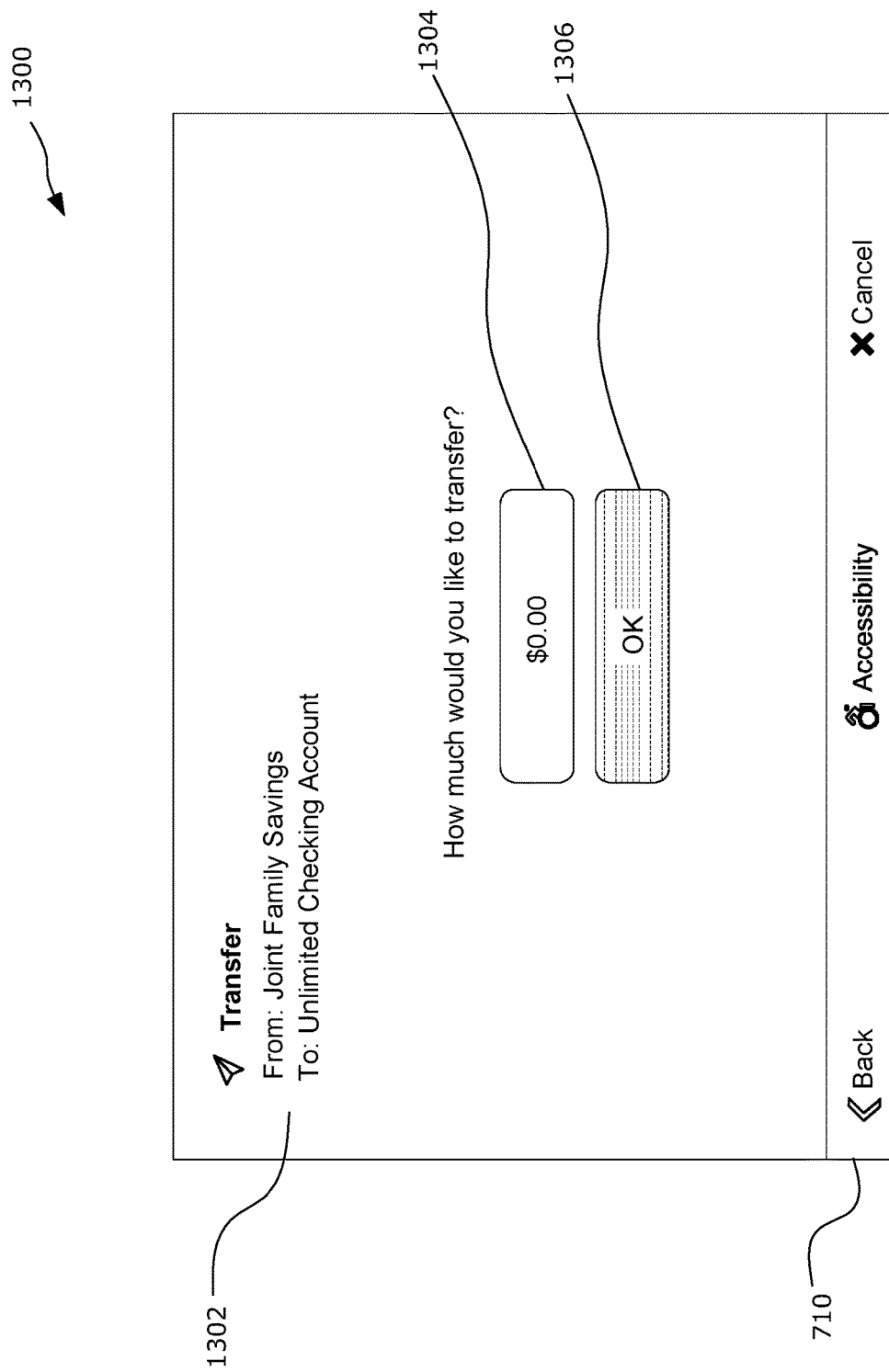
FIG. 13 is a data value selection interface for receiving a data value for a data transfer in accordance with example embodiments of the present disclosure.

Next, the method 500 proceeds directly to operation 508 in response to selection of an option 1120 for the destination account for performing a data transfer in which the automated device 100 and displays the data value selection interface 1300 of FIG. 13. The data value selection interface 1300 enables receipt of an input indicating a data value for the data transfer. The data value selection interface 1300 includes a visual context indicator 1302 indicating that the data value selection interface 1300 is in the context of performing a data transfer, in accordance with the selection of the option 702d, 1002d or 1112c received at a preceding interface 700, 1000, 1050 or 1180 in the interface sequence. The visual context indicator 1302 comprises an icon and text label indicating that the data value selection interface 1300 is in the context of performing a data transfer in the shown embodiment. The visual context indicator 1302 also includes an identification of the source account and destination account for the data transfer in accordance with selections received at preceding interfaces 1100, 1150 or 1180, and 1200 or 1250, in the interface sequence. The data value selection interface 1300 includes general options 710 as discussed above.

The data value selection interface 1300 includes an input field 1304 for entry of a data value for the data transfer. For example, a user may use the keypad 104 of the automated device 100 to provide input into the input field 1304. The keypad 104 may also provide the ability to backspace or cancel input. Other input mechanisms may also be used. The data value selection interface 1300 includes a confirmation button 1306 to confirm entry of the entered data value. Input may be received at the data value selection interface 1300 via entry of a data value into the input field 1304 and selection of the confirmation button 1306.

When input is received via the data value selection interface 1300, the method 500 proceeds to operation 510 at which the automated device 100 sends a signal to the first-party server 306, for example using a communication module of the automated device 100, to provide the data value, and identification of the source account and the destination account. In the context of FIG. 3, the automated device 100 may send a signal to the first-party server 306 via the communication network 304. The first-party server 306 may use the information provided by the automated device 100 to initiate a data transfer between the source account and destination account, both managed by the first-party server 306. The first-party server may process the data transfer information from the automated device 100 (e.g., to ensure that the information is valid) and send a signal back to the automated device 100 acknowledging the data transfer.

Figure 14:
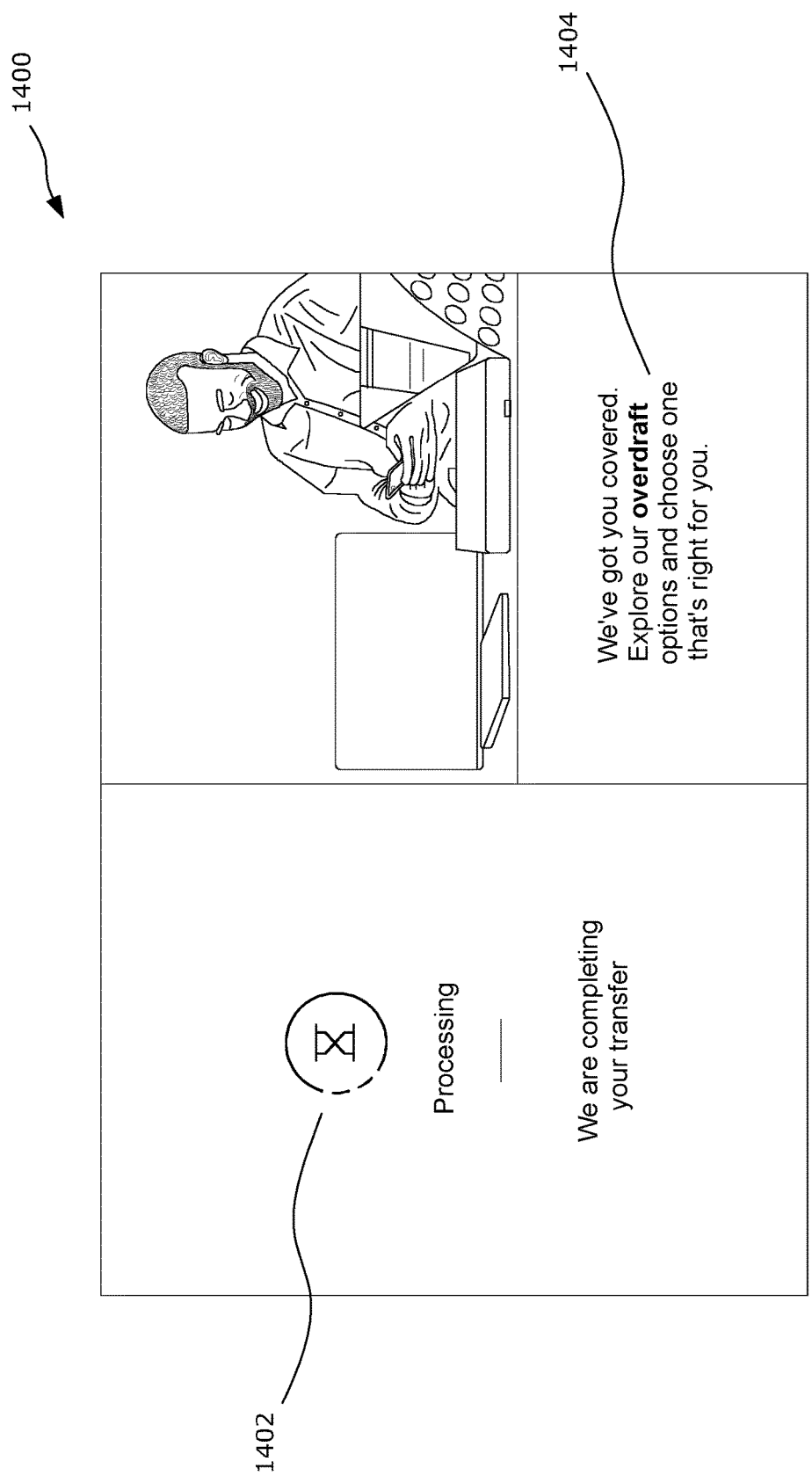
FIG. 14 is a processing waiting interface providing output indicating processing of a data transfer in accordance with example embodiments of the present disclosure.

Next, at operation 512, after sending the data transfer information to the first-party server 306 and before receiving the acknowledgement, the automated device 100 may display the processing waiting interface 1400 of FIG. 14. The processing waiting interface 1400 may indicate processing of the data transfer. The processing waiting interface 1400 in this example includes an animation 1402 to indicate processing. Other indicators, with or without animation, may be used. The processing waiting interface 1400 in this example also displays information 1404, which may or may not be similar to the information 904 that may be displayed at the authentication waiting interface 900 of FIG. 9. The processing waiting interface 1400 may be omitted in other embodiments in which the processing or waiting time is negligible.

Figure 15:
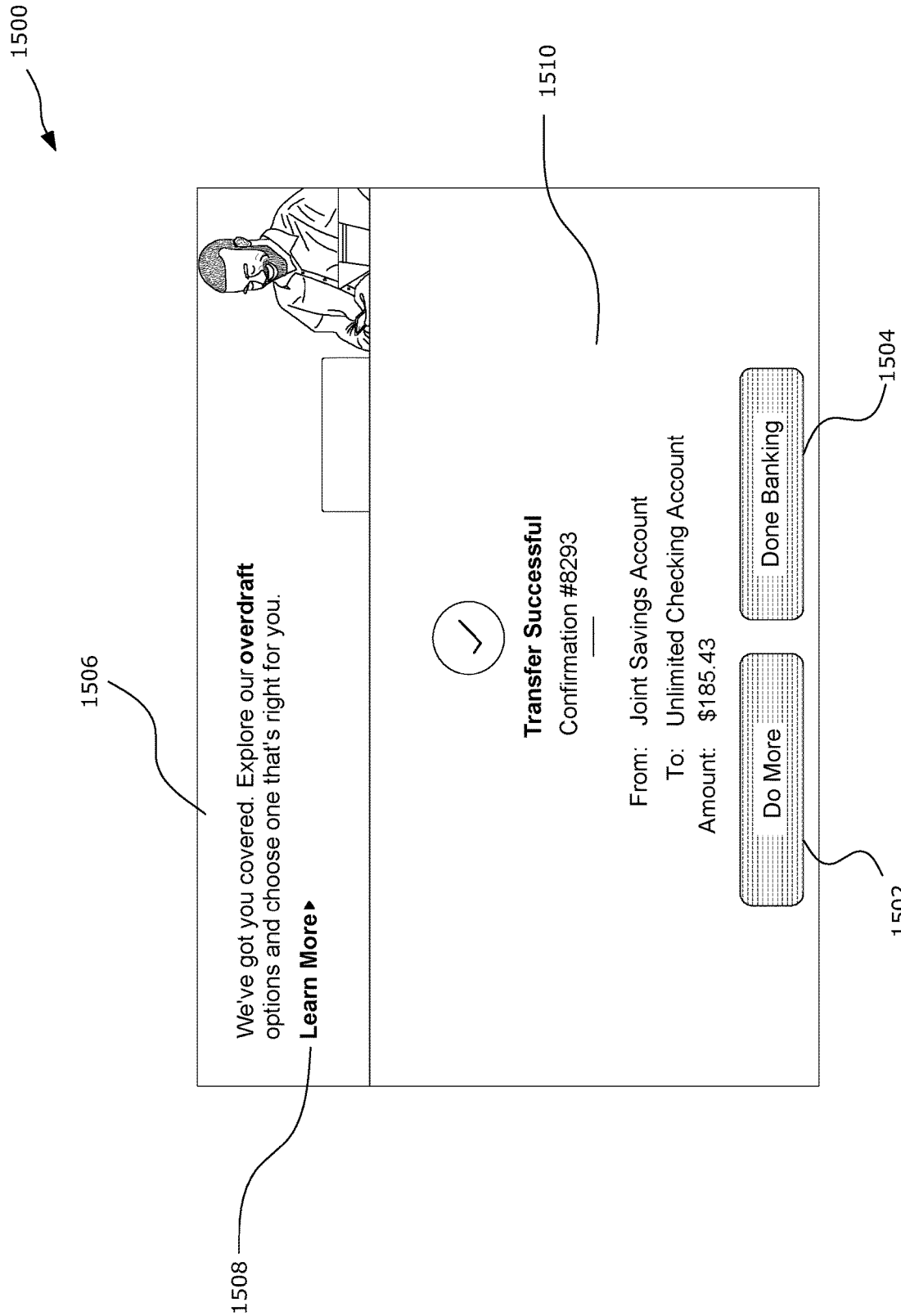
FIG. 15 is an example transaction acknowledgment interface indicating completion of the data transfer in accordance with example embodiments of the present disclosure.

In response to receipt of a signal from the first-party server 306 acknowledging the data transfer, the method 500 proceeds to the operation 514 at which the automated device 100 displays the transaction acknowledgment interface 1500 of FIG. 15. The transaction acknowledgment interface 1500 indicates successful completion of the data transfer. The transaction acknowledgment interface 1500 also provides a summary 1510 of the data transfer (e.g., showing the data value, destination account and source account for the data transfer). The summary 1510 may also include tracking data, such as a confirmation number, which may be used to track and/or confirm the data transfer. The tracking data may have been generated by the first-party server 306 and sent to the automated device 100 together with or following the acknowledgement signal.

The transaction acknowledgment interface 1500 provides an option 1502 to end the session and an option 1504 to continue the session. The transaction acknowledgment interface 1500 may also include information 1506, which may be the same as, similar to, or different from the information 904 provided by the authentication waiting interface 900 of FIG. 9. The transaction acknowledgment interface 1500 may also provide a selectable option 1508 to provide additional information further to the information 1506.

If the option 1502 is selected, the automated device 100 returns to the home interface 1000 of FIG. 10A to enable the session to continue, the method 500 returning to operation 502.

Figure 16:
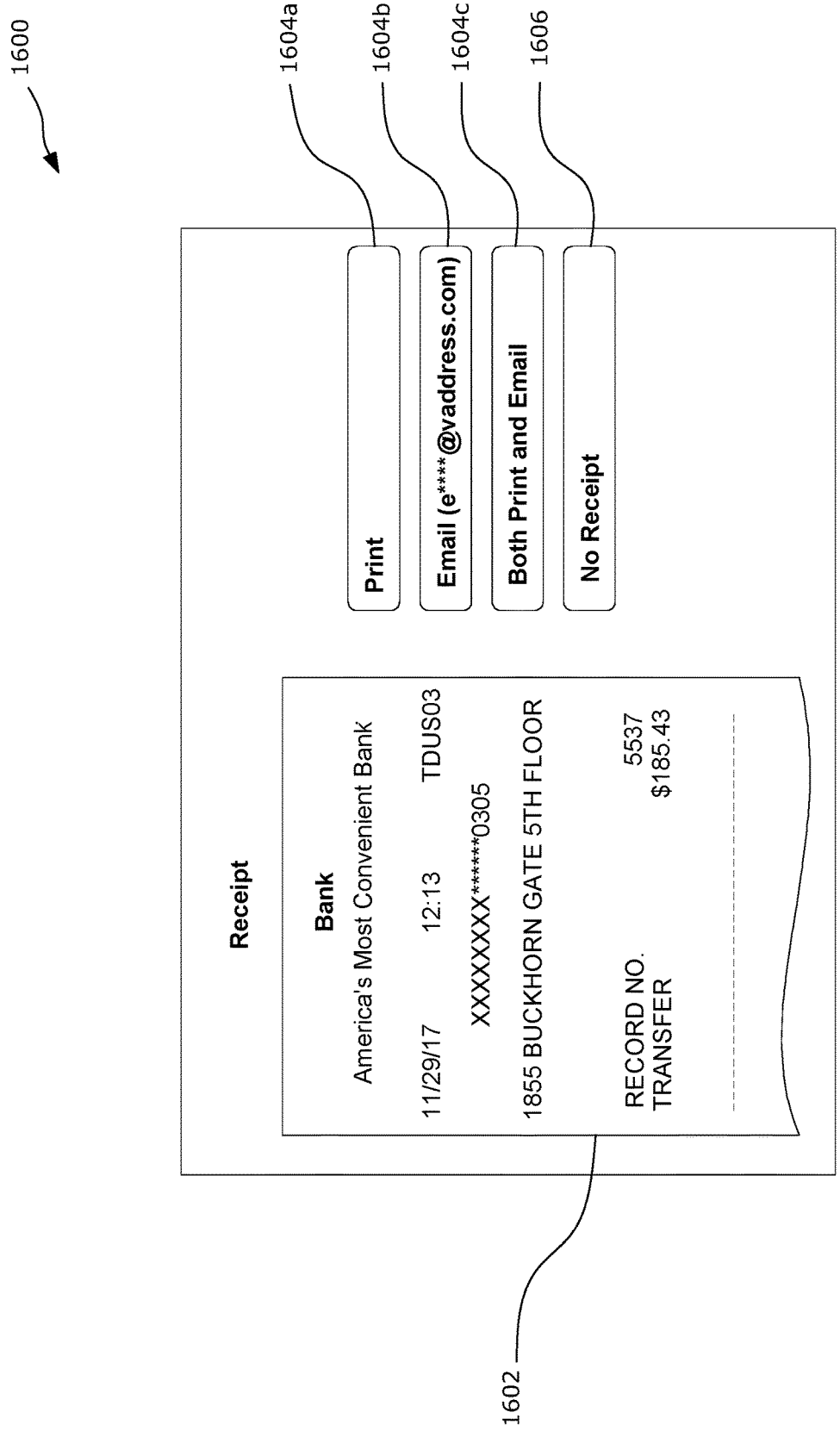
FIG. 16 is a record preview interface in accordance with example embodiments of the present disclosure.

At operation 516, directly in response to selection of the option 1504 to end the session, the automated device 100 displays the record preview interface 1600 of FIG. 16. The record preview interface 1600 provides a preview 1602 of a record of the session (e.g., in a visual form similar to a paper receipt). The record includes all data exchanges performed during the session. The record preview interface 1600 also provides one or more options 1604a-1604c (generally referred to as options 1604) to generate output of the record. The options 1604 in this example include an option 1604a to generate a physical output (e.g., paper receipt) of the record, an option 1604b to generate a digital output (e.g., transmission of an email or other digital communication) of the record, and an option 1604c to generate both a physical and a digital output of the record. The record preview interface 1600 also provides an option 1606 to not generate output of the record.

When a digital output is selected, the digital output may be sent to an email address linked to the account. For example, the automated device 100 may receive a signal from the first-party server 306 providing the email address. The option 1604b to generate a digital output of the record can thus automatically include at least a preview of the email address. In this way, a user can be sure that the digital output of the record (which may include sensitive, personal information) is being sent to the correct email address. When the digital output is an email and the option 1604b to generate the digital output is selected, the automated device 100 sends a digital version of the record to a designated email address via the communication module 140. The email may be sent directly by the automated device 100 via an email client or indirectly by sending a signal to the first-party server 306 via the communication module 140, the signal including information for all data exchanges performed during the session, which sends the email to the designated email address. The designated email address has a predefined value stored in the account information settings associated the accessed card and associated accounts, thereby facilitating the speed of the interaction.

Figure 18:
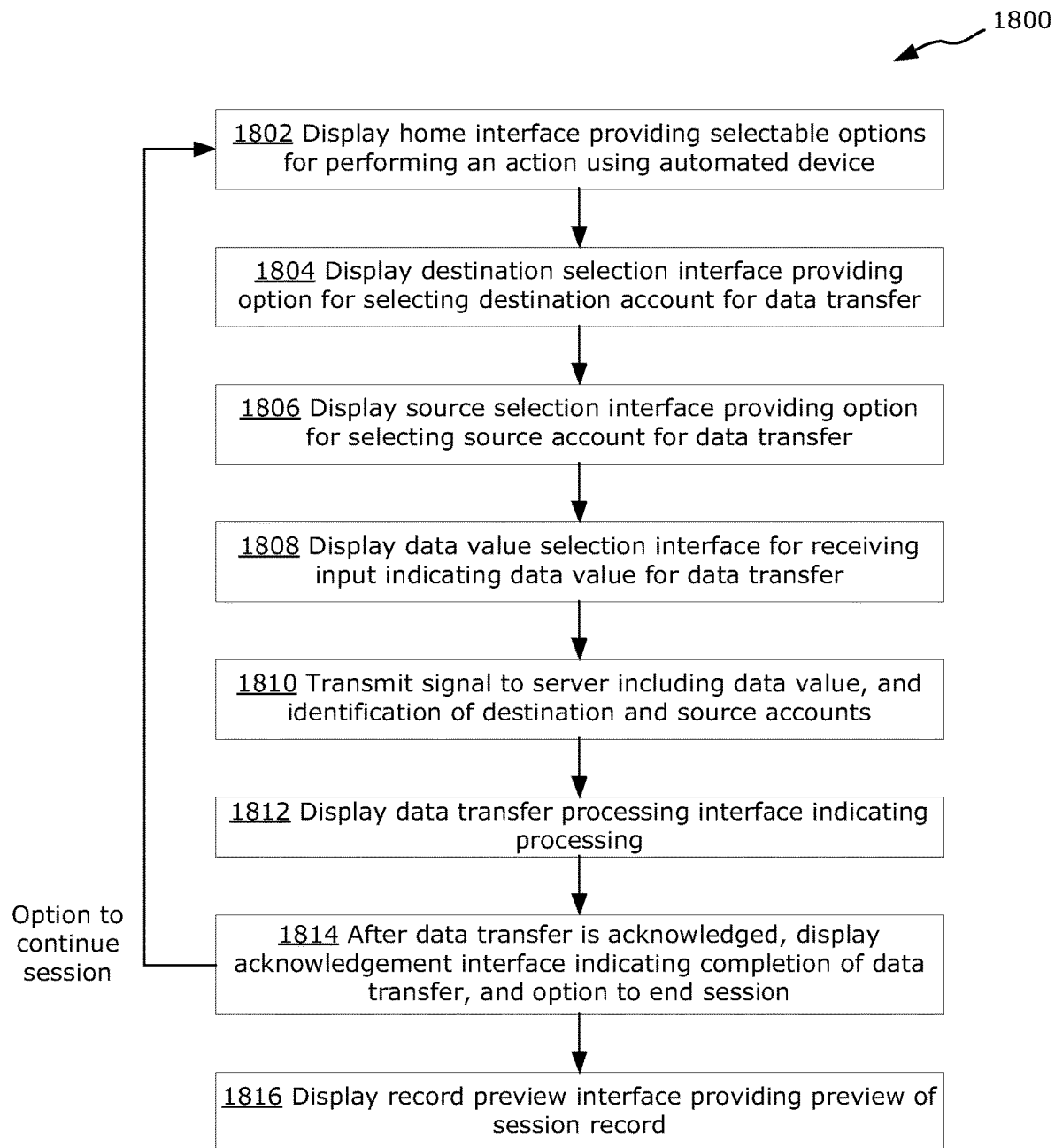
FIG. 18 is a flowchart illustrating an example method for performing a data transfer at an automated device in accordance with another example embodiment of the present disclosure.

FIG. 18 is a flowchart of an example method 1800 for performing a data transfer at an automated device in accordance with another example embodiment of the present disclosure. The method 1800 may follow the method 400 described above. For convenience, reference will be made to the automated device 100 illustrated in FIG. 1 although automated devices having different features may be used in other embodiments.

At operation 1802, the automated device 100 displays the home interface 1000 of FIG. 10A described above.

Figure 19A:
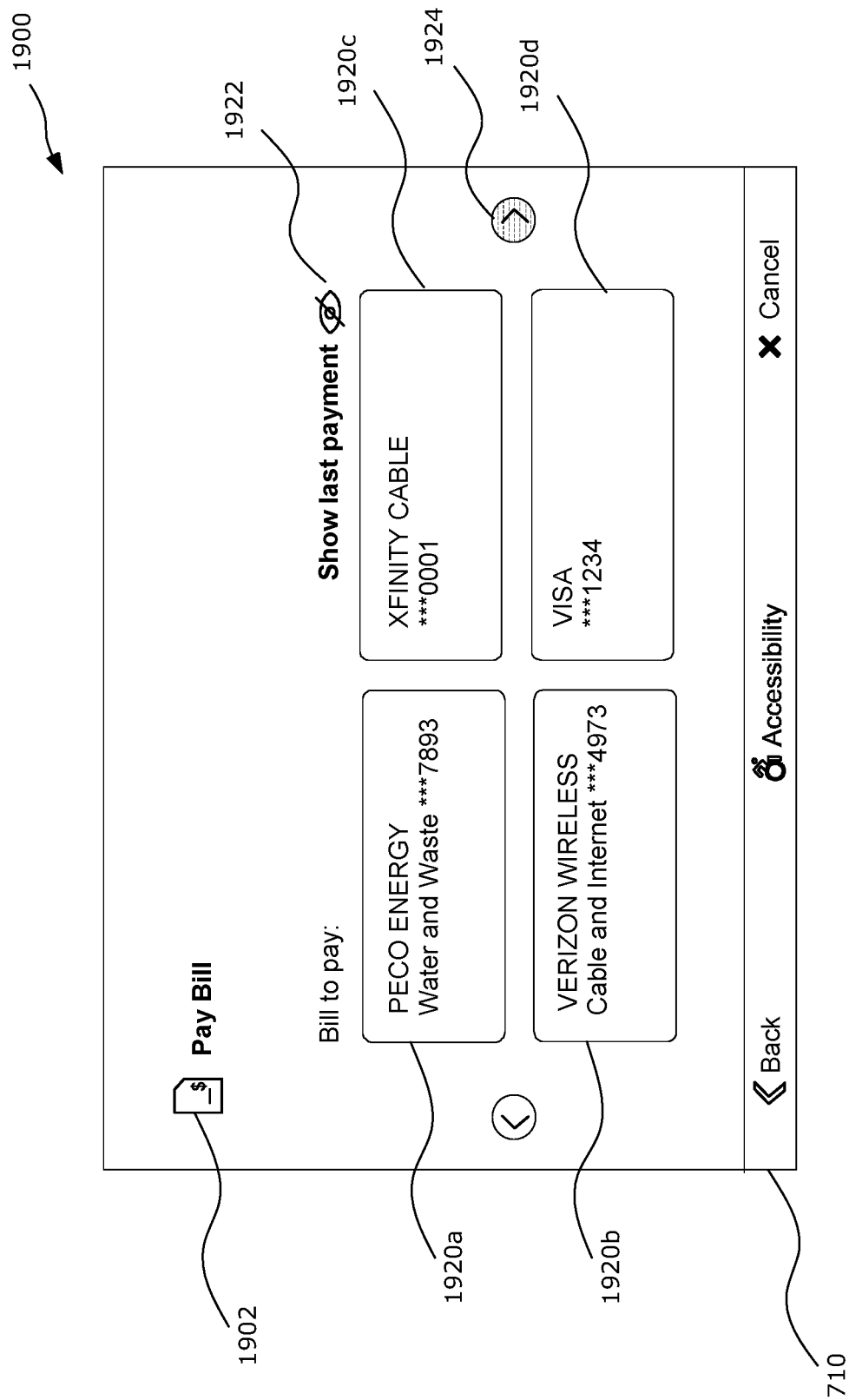
FIG. 19A is a destination selection interface providing options for selecting a destination account for a data transfer via the method of FIG. 18 in accordance with example embodiments of the present disclosure.

Directly in response to selection of the option 1002e for performing a data transfer, the method 1800 proceeds to 1804 in which the automated device 100 displays the destination selection interface 1900 of FIG. 19A.

The destination selection interface 1900 includes a context indicator 1902 indicating that the destination selection interface 1900 is in the context of performing a data transfer from a first-party account to a third-party account in accordance with the selection of the option 1002e in preceding interface 1000 or 1050. The destination selection interface 1900 provides one or more selectable options 1920a-1920d (generally referred to as options 1920) for selecting a destination account to receive the data transfer. The destination account may be a third-party account managed by a third-party service provider. The options 1920 may be populated with information about possible third-party destination accounts. Information about possible destination accounts may be received from the first-party server 306. The information may be dynamically received from the first-party server 306, so that the options 1920 may be populated with possible destination accounts in real-time and dependent on the user.

For example, a user profile stored at the first-party server 306 may include a list of destination accounts that are associated with the user account, as identified using the access card. The destination accounts that are associated with the user account may have been previously set by the user and/or automatically determined by the first-party server 306 (e.g., based on historical data transfers performed by the user). The information provided to the automated device 100 may include an identification of the third-party service provider associated with a selectable destination account, as well as an account number associated with a selectable destination account.

Each option 1920 may provide some identifying information about the destination account associated with the respective option, but the identifying information may be at least partially protected (e.g., using * symbols) to avoid sensitive information being inadvertently exposed.

The destination selection interface 1900 also provides a selectable option 1922 to display further information about all the accounts associated with the displayed options 1920. For example, the option 1922 may be selected to display information about a historical data transfer (e.g., most recent data transfer, or last bill payment) for each associated destination account. The information about historical data transfers for each destination account may be received from the first-party server 306. Such information may be received from the first-party server 306 together with the information identifying possible destination accounts, as discussed above. Alternatively, information about historical data transfers may be received from the first-party server 306 as needed, for example dynamically received from the first-party server 306 in response to selection of the option 1922. In this way, the automated device 100 may dynamically generate the destination selection interface 1950 to provide further information about possible destination accounts.

Figure 19B:
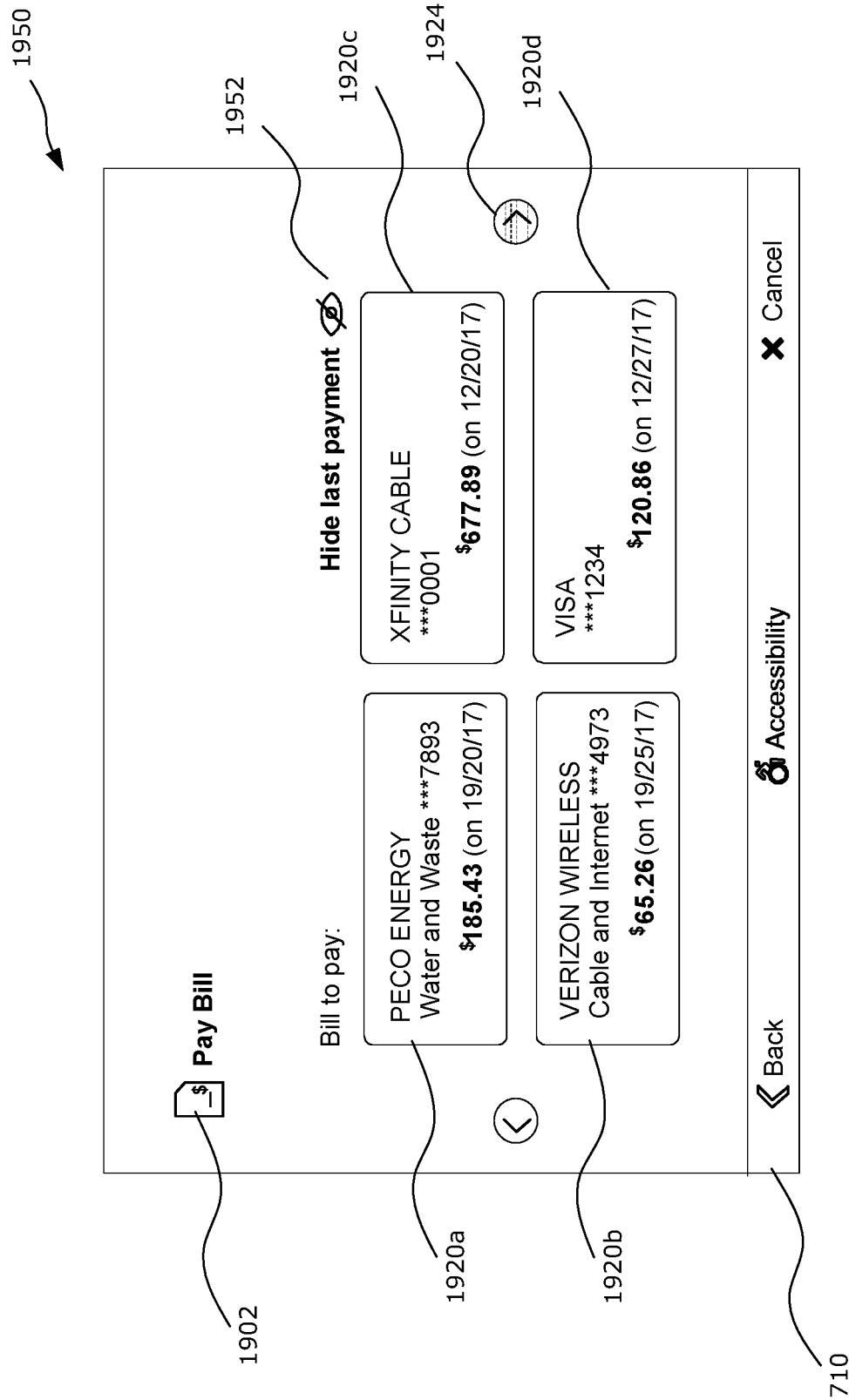
FIG. 19B is an alternate destination selection interface showing information about historical data transfers via the method of FIG. 18 in accordance with example embodiments of the present disclosure.

In this example, selecting the option 1922 causes the destination selection interface 1950 of FIG. 19B (also referred to as an alternate destination selection interface) to be displayed. The destination selection interface 1950 is similar to the destination selection interface 1900, and the two interfaces 1950, 1900 have common elements. The destination selection interface 1950 may be considered a sub-screen, a variation or a transition of the destination selection interface 1900. Thus, in some cases, the destination selection interface 1950 and the interface 1900 may be considered to be the same interface. In the destination selection interface 1950, each destination account option 1920 is modified to include a visual indication of a historical data transfer. In the example shown, each option 1920 displays a data value and date for a most recent data transfer to each respective destination account. The option 1922 is replaced by an option 1952 to hide the further information. Selection of options 1922 and 1952 may enable a user to toggle or switch between the destination selection interfaces 1900 and 1950. Generally, the options and functions available at the interface 1900 are the same at the destination selection interface 1950, with the exception of the options 1922 and 1952.

In cases where the number of destination accounts that have been identified exceed the number of displayable options 1920, the interface 1900 also provides scroll options 1924 to scroll to display of additional account options associated with additional accounts. The interface 1900 also includes general options 710 as discussed above.

Figure 20A:
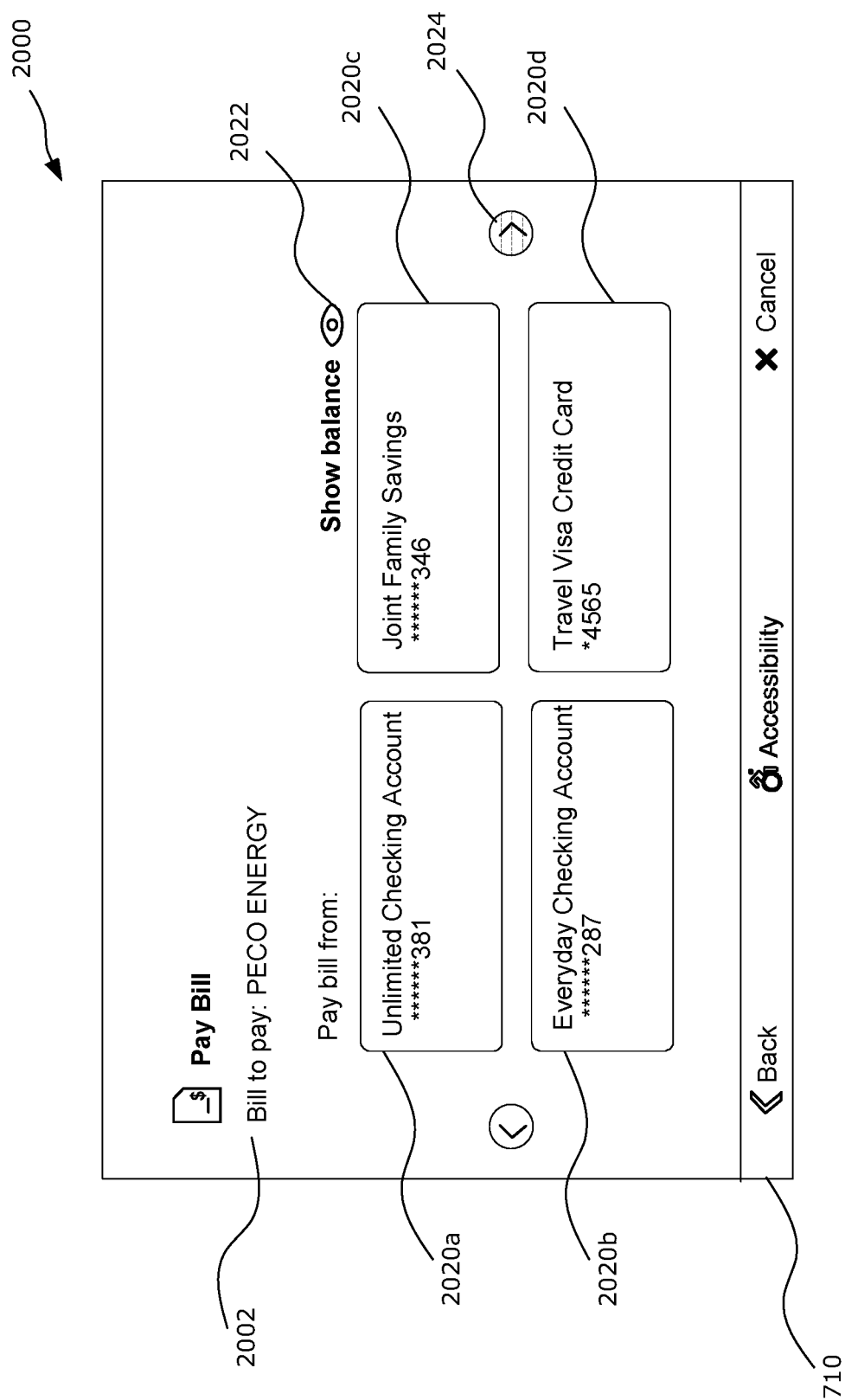
FIG. 20A is a source selection interface that provides options for selecting a source account for a data transfer via the method of FIG. 18 in accordance with example embodiments of the present disclosure.

Directly in response to selection of a destination account, the method 1800 proceeds to operation 1806 to display the source selection interface 2000 of FIG. 20A. The source selection interface 2000 provides a selectable option for selecting a source account for the data transfer.

The source selection interface 2000 includes a context indicator 2002 indicating that the selection of accounts is in the context of performing a data transfer, in accordance with the selection of the option 1002e in the earlier interface 1000 or 1050. The source selection interface 2000 includes general options 706, as discussed above. Further, the context indicator 2002 is updated to indicate the destination account for the data transfer, in accordance with the selection received at the destination selection interface 1900 or 1950. The source selection interface 2000 includes general options 710 as discussed above.

The source selection interface 2000 displays one or more selectable options 2020a-2020d (generally referred to as account option 2020) to select a source account for the data transfer. The options 2020 are similar to the account options 1020 described above. The source selection interface 2000 also provides a selectable option 2022 to display further information about all the accounts associated with the displayed account options 2020. For example, the option 2022 may be selected to cause the account options 2020 to display the current state (e.g., current balance) of each associated account.

Figure 20B:
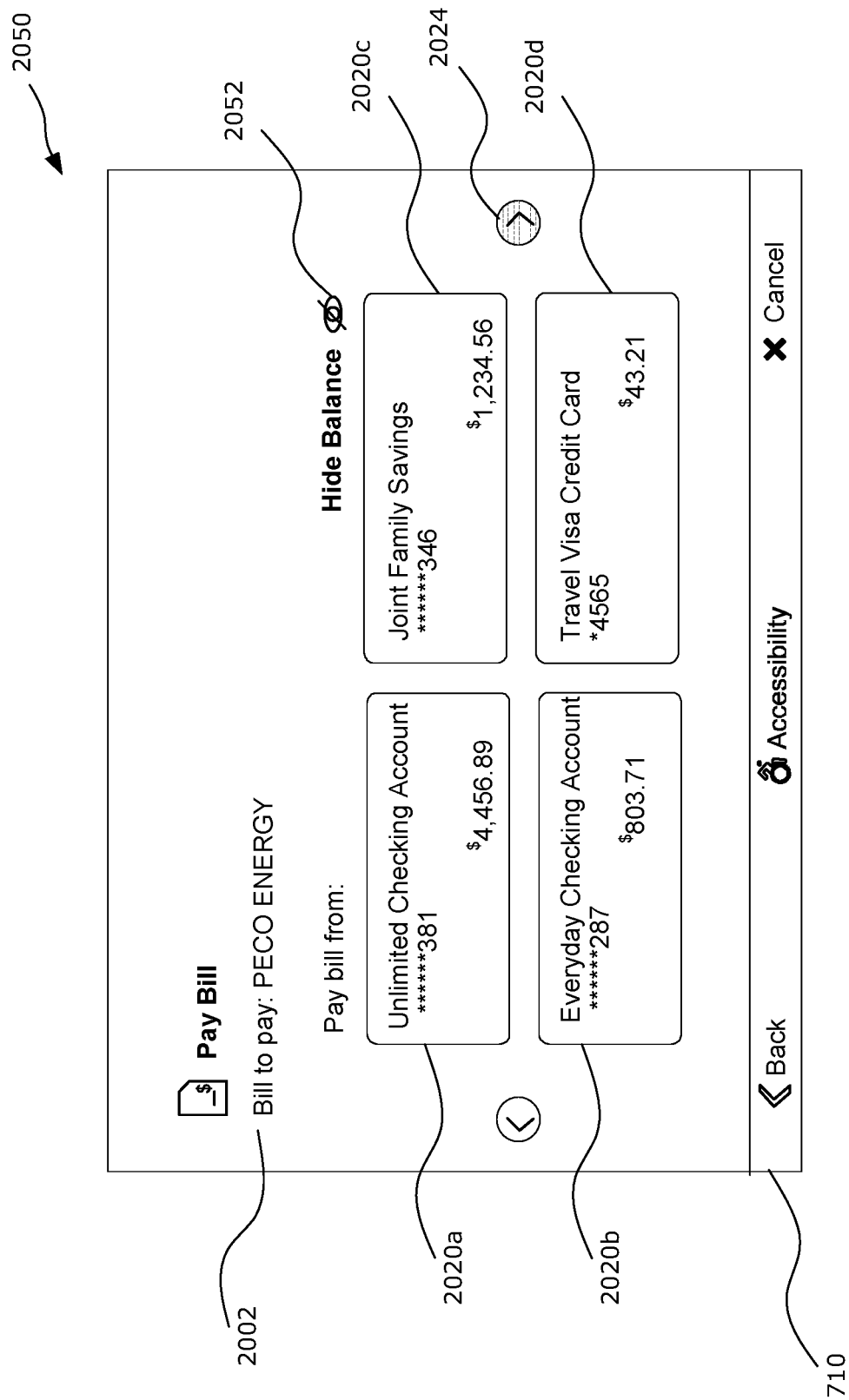
FIG. 20B is an alternate source selection interface showing the current states of selectable accounts in accordance with example embodiments of the present disclosure.

In this example, selecting the option 2022 causes the source selection interface 2050 of FIG. 20B (also referred to as an alternate source selection interface) to be displayed. The source selection interface 2050 is similar to the source selection interface 2000, and the two source selection interfaces 2050, 2000 have common elements. The source selection interface 2050 may be considered a sub-screen, a variation or a transition of the source selection interface 2000. Thus, in some cases, the source selection interface 2050 and the source selection interface 2000 may be considered to be the same interface. The source selection interface 2050 may be dynamically generated using information received from the server, similar to the manner in which the interface 1050 may be dynamically generated, as discussed above. In this way, the automated device 100 may dynamically generate the source selection interface 2050 to provide current information about possible source accounts in real-time.

In the source selection interface 2050, each account option 2020 is modified to include a visual indication of the current state of the respective associated account (e.g., shows the numerical current balance in each account), and the option 2022 is replaced by an option 2052 to hide the further information. Selection of options 2022 and 2052 may enable a user to toggle or switch between the source selection interfaces 2000 and 2050. Generally, the options and functions available at the source selection interface 2000 are the same at the source selection interface 2050, with the exception of the options 2022 and 2052.

In cases where the number of accounts that have been identified for the access card exceed the number of displayable account options 2020, the source selection interface 2000 also provides scroll options 2024 to scroll to display of additional account options associated with additional accounts.

The account options 2020 may be dynamically populated with information received from the server, similarly to the account options 1020 as discussed above.

Figure 21:
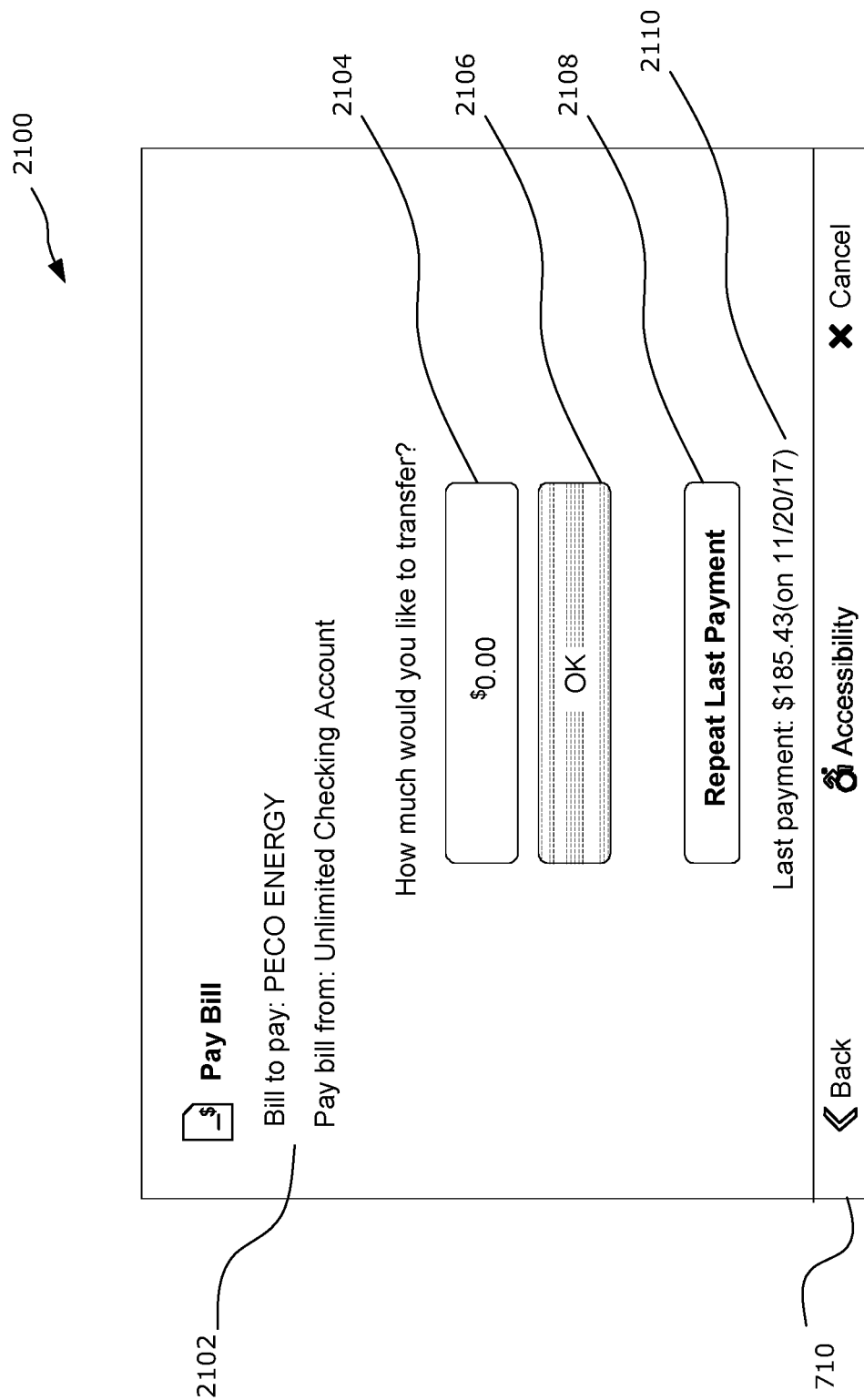
FIG. 21 is a data value selection interface for receiving a data value for a data transfer via the method of FIG. 18 in accordance with example embodiments of the present disclosure.

Directly in response to selection of an option 2020 for the source account, the method 1800 proceeds to operation 1808, to display the data value selection interface 2100 of FIG. 21. The data value selection interface 2100 enables receipt of an input indicating a data value for the data transfer. The data value selection interface 2100 includes a context indicator 2102 indicating that the data value selection interface 2100 is in the context of performing a data transfer, in accordance with the selection of the option 1002e received at preceding interface 1000 or 1050 in the interface sequence. Further, the context indicator 2102 is updated to indicate the destination account and the source for the data transfer, in accordance with selections received at preceding interfaces 1900 or 1950, and 2000 or 2050 in the interface sequence. The data value selection interface 2100 includes general options 710 as discussed above.

The data value selection interface 2100 includes a field 2104 for entry of a data value for the data transfer. For example, a user may use the keypad of the automated device 100 to provide input into the field 2104. The keypad may also provide the ability to backspace or cancel input. Other input mechanisms may also be used. The data value selection interface 2100 includes a confirmation button 2106 to confirm entry of the entered data value. The data value selection interface 2100 also includes an option 2108 to select a predetermined data value for the data transfer. In this example, the predetermined data value is a historical data value of a historical data transfer (e.g., data value of most recent data transfer) to the destination account. The data value selection interface 2100 also provides historical information 2110 about the historical data transfer, for example the data value and date of the historical data transfer. As discussed above, information about the historical data transfer may be received in real-time from the first-party server 306, in order to populate the historical information 2110. Input may be received at the data value selection interface 2100 via entry of a data value into the field 2104 and selection of the confirmation button 2106, or via selection of the option 2108 for the predetermined data value.

When input is received via the data value selection interface 2100, the automated device 100 at operation 1810 transmits a signal to the first-party server 306, for example using a communication module of the automated device 100, to provide the data value, and identification of the destination and source accounts. In the context of FIG. 3, the automated device 100 may transmit a signal to the first-party server 306 via the communication network 304.

The first-party server 306 may use the information provided by the automated device 100 to initiate a data transfer between the first-party source account managed by the first-party server 306 and the third-party destination account managed by a third-party server 310 of FIG. 3. The first-party server 306 and third-party server 310 may communicate with each other to, for example, authenticate the data transfer and reconcile data values between the destination and source accounts. In some examples, the communication and reconciliation between the first-party server 306 and the third-party server 310 may take place at a set time, not necessarily in real-time. For example, the first-party server 306 may store data transfer information received from the automated device 100 until the end of each day, and reconcile all data transfers in bulk at the end of each day.

The first-party server 306 may process the data transfer information from the automated device 100 (e.g., to ensure that the information is valid) and send a signal back to the automated device 100 acknowledging the data transfer.

At operation 1812, after transmitting the data transfer information to the first-party server 306 and before receiving the acknowledgement, the automated device 100 may display the interface 1400 of FIG. 14 (also referred to as a data transfer processing interface). The interface 1400 may indicate processing of the data transfer. The interface 1400 may also be referred to as a processing screen or a wait screen. The interface 1400 may be omitted in other embodiments in which the processing or waiting time is negligible.

The interface 1400 in this example includes an animation 1402 to indicate processing. Other indicators, with or without animation, may be used. The user interface 1400 in this example also displays information 1404, which may or may not be similar to the information 904 that may be displayed at the interface 900 of FIG. 9.

In response to receipt of a signal from the first-party server 306 acknowledging the data transfer, at operation 1814 the automated device 100 displays the acknowledgement interface 2200 of FIG. 22. The acknowledgement interface 2200 indicates completion of the data transfer. It should be noted that the data transfer may actually be completed at a later time between the first-party server 306 and third-party server 310, as discussed above. The acknowledgement interface 2200 also provides a summary 2210 of the data transfer (e.g., showing the data value, destination account and source account for the data transfer). The summary 2210 may also include tracking data, such as a confirmation number, which may be used to track and/or confirm the data transfer. The tracking data may have been generated by the first-party server 306 and transmitted to the automated device 100 together with or following the acknowledgement signal.

The acknowledgement interface 2200 provides an option 2202 to end the session and an option 2204 to continue the session. The acknowledgement interface 2200 may also include information 2206, which may be the same as, similar to, or different from the information 904 provided by the interface 900 of FIG. 9. The acknowledgement interface 2200 may also provide a selectable option 2208 to provide additional information further to the information 2206.

If the option 2202 is selected, the automated device 100 may return to a previous interface or another interface to enable the session to continue. For example, the method 1800 may return to 1802 to display the interface 1000 of FIG. 10.

At operation 1816, directly in response to selection of the option 2204 to end the session, the automated device 100 displays the interface 1600 of FIG. 16 (also referred to as a record preview interface). The interface 1600 provides a preview 1602 of a record of the session (e.g., in a visual form similar to a paper receipt). The record includes all data exchanges performed during the session. The interface 1600 also provides one or more options 1604a-1604c (generally referred to as options 1604) to generate output of the record. The options 1604 in this example include an option 1604a to generate a physical output (e.g., paper receipt) of the record, an option 1604b to generate a digital output (e.g., transmission of an email or other digital communication) of the record, and an option 1604c to generate both a physical and a digital output of the record. The interface 1600 also provides an option 1606 to not generate output of the record.

Where a digital output is selected, the digital output may be transmitted to an email address linked to the account. The email address may be predefined and associated with the account, thus avoiding the need for a user to manually input the email address and thereby facilitating a faster and more convenience interaction. For example, the automated device 100 may receive a signal from the first-party server 306 providing the email address. The option 1604b to generate a digital output of the record can thus automatically include at least a preview of the email address. In this way, a user can be sure that the digital output of the record (which may include sensitive, personal information) is being sent to the correct email address. When the digital output is an email and the option 1604b to generate the digital output is selected, a digital version of the record is sent to the email address via the communication module 140. The email may be sent directly by the automated device 100 (e.g., via an email client) or may be sent via the first-party server 306. Where the email is sent via the first-party server 306, the automated device 100 may transmit a signal to the first-party server 306 via the communication module, the signal including information for generating the record, and the first-party server 306 in turn generates and transmits the email to the email address.

Figure 6:
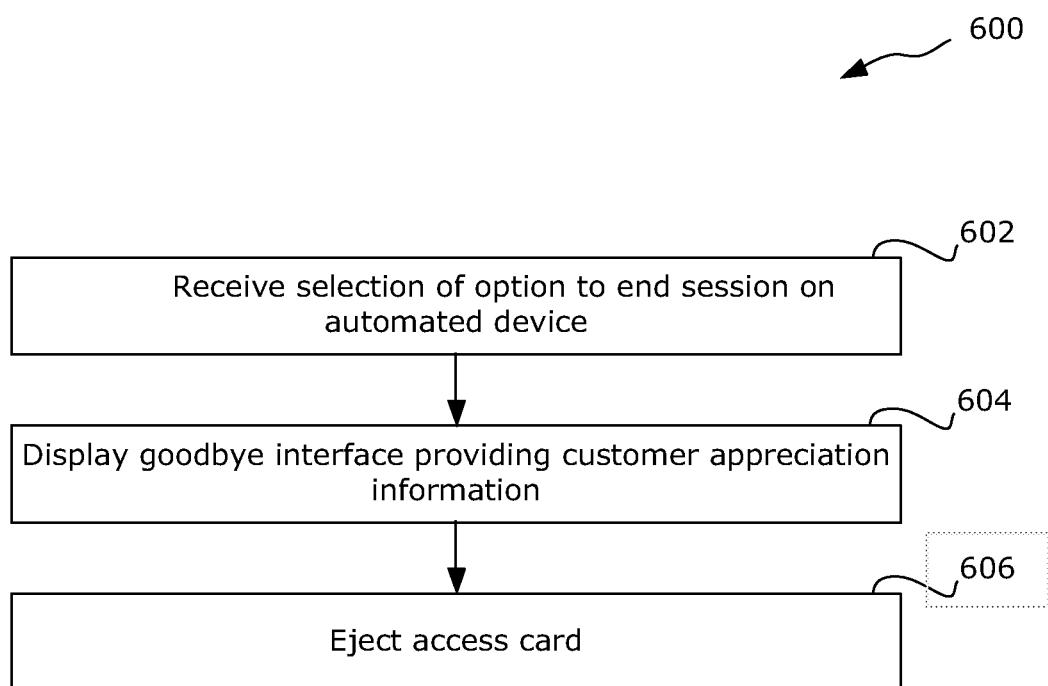
FIG. 6 is a flowchart illustrating a method for ending a session at an automated device in accordance with example embodiments of the present disclosure.

FIG. 6 is a flowchart of a method 600 for ending a session on an automated device 100 in accordance with example embodiments of the present disclosure. The method 600 may follow the method 500 of FIG. 5A, the method 520 of FIG. 5B, or the method 1800 of FIG. 18. The method 600 may be performed by the automated device 100 illustrated in FIG. 1, for example. For convenience, reference will be made to the automated device 100 illustrated in FIG. 1 although automated devices having different features may be used in other embodiments.

At operation 602, the automated device 100 receives a selection of an option to proceed to end a current session on the automated device 100. For example, making a selection of any of the options 1604, 1606 provided by the record preview interface 1600 of FIG. 16.

Figure 17:
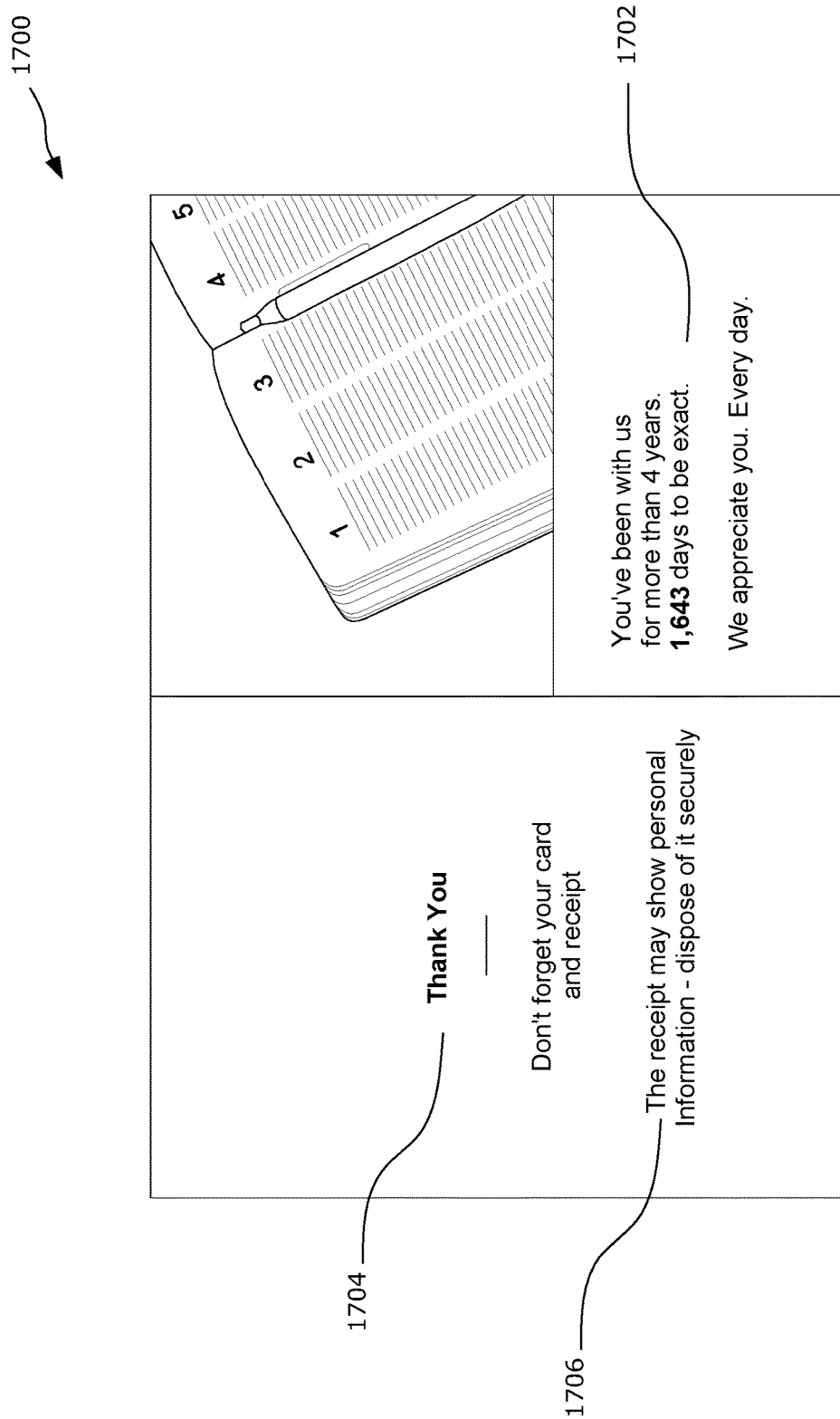
FIG. 17 is a goodbye interface for providing customer appreciation information in accordance with example embodiments of the present disclosure.

At operation 604, directly in response to the selection of any of the options 1604, 1606 listed above, the automated device 100 displays the goodbye interface 1700 of FIG. 17. The goodbye interface 1700 provides customer appreciation information 1702. The customer appreciation information 1702 may include information specific to the account (e.g., number of days since the account was started with the service provider). The customer will appreciate information 1702 may show only non-sensitive information. Certain information about the account may be requested by the automated device from the first-party server 306 to dynamically generate account-specific customer appreciation information 1702. The goodbye interface 1700 may also include other information 1704, such as a general thank you message. Other types of information (e.g., similar to the information 904 provided by the authentication waiting interface 900 of FIG. 9) may be provided by the goodbye interface 1700. When the option 1604a or 1604c was selected at the record preview interface 1600 of FIG. 16 to generate a physical output of the session record, the goodbye interface 1700 may provide reminder information 1706 relevant to the physical output. When a physical output was not selected, the reminder information 1706 may be omitted or may be modified to not refer to the physical output.

At operation 606, the inserted access card is ejected from the automated device 100. The access card may be ejected while the goodbye interface 1700 is being displayed. The goodbye interface 1700 may be displayed for a preset length of time (e.g., 5 seconds), or until the automated device 100 detects that the access card has been removed.

Optionally, one or more of the user interfaces discussed above may include display of a background image (which may be the same or may differ between different user interfaces within a session). The background image may include animation, for example. The background image may be different for different users, change depending on the season, change depending on the time of day, or have other such variations.

Optionally, one or more of the interfaces discussed above may also include branding, such as the logo of a service provider associated with the automated device 100.

In some examples, one or more processing or waiting screens may be skipped. For example, processing or waiting time may be negligible and the corresponding processing or waiting screen may not be displayed when the processing or waiting time is negligible.

The present disclosure provides an automated device for data transfer and associated methods. The automated device communicates with a server to exchange data which is used to dynamically populate one or more of the interfaces in a sequence of interfaces. The sequences are believed to provide an improved user experience with an automated device when performing actions related to exchange of data managed by a service provider. For example, the sequences are believed to be more efficient than conventional interfaces by reducing the number of interfaces a user navigates to complete an action, by ordering the interfaces in the sequences, and by including contextual or summary information in the interfaces as a visual cue (e.g., visual affordance, guidance or nudge) throughout the sequence while completing the action without cluttering the interface with unnecessary information.

The Applicant notes that designing an effective user interface is not a process which is predictable or which lends itself to trial and error given the vast number of permutations that are possible. Factors affecting whether a user interface is effective include identifying efficient interactions which are relatively easy to perform, relatively easy to remember, have discoverability which allows users to discover functions during normal use without formal training, and which can be differentiated from other interactions by users and by the device relatively easily. Arbitrary or poorly considered user interfaces tend to create awkward and unnatural user experiences which make the required interaction harder to perform, harder to remember, undiscoverable (or at least less discoverable), and harder to differentiate from other interactions. Given the complex nature of human-machine interactions, effective user interfaces cannot be reliably predicted. This is known to the person of ordinary skill in the art of user interface design.

Studies performed by the Applicant with regard to the sequences of user interfaces disclosed in the present disclosure show increased user satisfaction with respect to interactions with the automated device across a variety of user groups, including users with accessibility issues such as seniors, users with disabilities, users with language comprehension challenges, and users who are uncomfortable with technology. Indeed, one consideration in the design of the user interface of the present disclosure is accessibility, and the design of a user interface that is effective for both users with and without accessibility issues.

The present disclosure provides an automated device in which the sequence of interfaces may begin with an interface that displays options that are available at the automated device. The options that are displayed may depend on the account(s) associated with an inserted access card, may depend on the capabilities of the automated device and/or may depend on a current state of the automated device. In this way, a user is provided information about actions that may be performed using the automated device at the very start of the session, prior to entry of an authentication code. This may enable the session to skip displaying another interface that shows available options, and shorten the interface sequence. The user may also be able to determine from the start whether a desired action can or cannot be completed using the automated device.

The present disclosure provides an automated device in which the sequence of interfaces may include interfaces that implicitly or explicitly confirm a selection made in a prior interface. For example, an interface may display contextual information that indicates the interface is part of an interface sequence used to perform a prior-selected action. An interface may also display contextual information to indicate that the action is being performed in the context of a particular prior-selected account.

The present disclosure provides an automated device that may provide an interface that displays a preview of a record of the session (e.g., a preview of a transaction receipt). The interface may also provide options for outputting the record, for example printing a physical copy of the record (e.g., using a printer peripheral of the automated device) and/or outputting a digital copy of the record to an email address associated with the account. The interface may exchange data with the backend server to retrieve the email address associated with the account (e.g., a primary email address when multiple email addresses associated with the user account). In some cases, the interface may also display a preview of the email address (e.g., showing the first several characters of the email address), to assure the user the copy of the record is being sent to the correct email address. The interface may also provide an option to not generate an output of the record, for example the user may be satisfied after viewing the preview of the record on the interface.

The present disclosure provides an automated device that may provide an interface may display information that is personalized or customized based on the user account within active interfaces in which user interaction is involved and within passive interfaces displayed during processing delays (if any) and the end of the session. The customized information may be non-sensitive information (e.g., not related to financial data). The non-sensitive information may be a form of customer appreciation information. Such personalized information may be displayed without interfering with the sequence of interfaces required to perform an action. For example, such personalized information may be displayed at the beginning of a session, at the end of a session, or as part of an interface within the sequence. Displaying such non-sensitive, personalized information may help to convey a sense of appreciation, and help to engender user loyalty or goodwill towards the service provider. As an example, the number of days a user has been a customer of the service provider may be displayed at the end of a session. The interface may also display information may be used to inform the user of features and options provided by the automated device and/or service provider associated with the automated device. This may enable new features/options, useful features/options or rarely used features/options to be brought to the user's attention. The information may also provide general user appreciation information, marketing information, or other customized or non-customized information.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, erasable programmable ROM (EPROM) memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The present disclosure includes figures showing designs in the form of user interfaces in which at least some of the elements are shown with boundary lines illustrated as solid lines. The use of solid or dotted (broken) lines is not intended to be limiting for the purpose of design patent protection or industrial design protection. The designs of the present disclosure are not intended to be limited to the illustrated embodiments in which some design elements are shown in solid boundary lines and other design elements may be shown in dotted lines. It is contemplated that boundary lines that are depicted in the enclosed drawings as solid lines may be disclaimed and replaced with broken boundary lines in some embodiments for the purpose of design patent protection or industrial design protection, and vice versa.

The invention claimed is:

1. An automated teller device comprising:
a display screen;
a communication subsystem for communication with a server;
a processor coupled to the display screen and the communication subsystem; and
a memory coupled to the processor, the memory having computer-executable instructions stored thereon, the instructions, when executed by the processor, causing the automated device to, during a session:
   display, on the display screen, a welcome user interface screen providing a plurality of selectable elements for performing an action using the automated device;
   directly in response to selection of an element to initiate a data transfer from the welcome user interface screen, display, on the display screen, an authentication user interface screen providing an input field for receiving an authentication code associated with an access card inserted into the automated device;
   directly in response to receipt of validation of an input received in the input field of the authentication user interface screen, display, on the display screen, a source selection user interface screen providing a selectable element for selecting a source account for the data transfer;

directly in response to selection of the source account, display, on the display screen, a destination selection user interface screen providing a selectable element for selecting a destination account for the data transfer;

directly in response to selection of the destination account, display, on the display screen, a data value selection user interface screen providing an input field for receiving a data value for the data transfer;

directly in response to receipt of confirmation of an input received in the input field of the data value selection user interface screen, send a signal to the server, via the communication subsystem, the signal including the source account, the destination account and the data value for the data transfer;

directly in response to receipt of an acknowledgment signal from the server including an indication that the data transfer was completed via the communication subsystem, display, on the display screen, a transaction acknowledgment user interface screen indicating completion of the data transfer, the transaction acknowledgment user interface screen providing a selectable element to end the session and a selectable element to continue the session; and directly in response to selection of the element to end the session in the transaction acknowledgment user interface screen, display, on the display screen, a record preview user interface screen providing a preview of a record of the session and a selectable element to generate output of the records;

wherein the welcome user interface screen, the authentication user interface screen, the source selection user interface screen, the destination selection user interface screen, the data value selection user interface screen, the a transaction acknowledgment user interface screen indicating completion of the data transfer, the transaction acknowledgment user interface screen, and the record preview user interface screen are distinct and separate user interface screens.

2. The automated teller device of claim 1, wherein the selectable element to generate output of the record in the record preview user interface screen includes a selectable element to send the output of the record to an email address linked to the account, and wherein the selectable element to send the output of the record to the email address includes a preview of the email address, wherein the instructions further cause the automated device to:

directly in response to selection of the selectable element to send the output of the record to an email address linked to the account, send a digital version of the record of the session to the email address linked to the account via the communication subsystem.

3. The automated teller device of claim 1, wherein the instructions further cause the automated device to:

directly in response to selection of a selectable element on the record preview user interface screen, display, on the display screen, a goodbye user interface screen providing non-sensitive customer appreciation information specific to the account.

4. The automated teller device of claim 1, wherein the source selection user interface screen, destination selection user interface screen, and data value selection user interface screen each includes a respective visual context indicator indicating that the source selection user interface screen, destination selection user interface screen, and data value selection user interface screen each is provided in the context of the data transfer.

5. The automated teller device of claim 4, wherein the visual context indicator comprises an icon and text label.

6. The automated teller device of claim 4, wherein the visual context indicator of the destination selection user interface screen further indicates the source account for the data transfer, and wherein the visual context indicator of the data value selection user interface screen further indicates the source account and destination account for the data transfer.

7. The automated teller device of claim 1, wherein the instructions further cause the automated device to:

before displaying the authentication screen:
  extract information from the access card inserted into the automated device;
  send a signal including the information extracted from the access card to the server, via the communication subsystem;
  receive an acknowledgment signal from the server in response to the signal including the information extracted from the access card, via the communication subsystem, the acknowledgment signal providing information about accounts associated with the access card.

8. The automated teller device of claim 7, wherein the instructions further cause the automated device to:

directly in response to selection of the selectable element to continue the session in the transaction acknowledgment user interface screen, display, on the display screen, a home user interface screen providing a plurality of selectable elements for performing an action using the automated device, wherein the home user interface screen is populated with information about the accounts associated with the access card received from the server.

9. The automated teller device of claim 1, wherein the instructions further cause the automated device to:

display, on the display screen, a processing waiting user interface screen providing output indicating processing of the data transfer while awaiting an indication that the data transfer was completed;

in response to receipt of an acknowledgment signal from the server, via the communication subsystem, including the indication that the data transfer was completed, proceed to display the transaction acknowledgment user interface screen.

10. The automated teller device of claim 1, wherein the instructions further cause the automated device to:

display, on the display screen, an authentication waiting user interface screen providing output indicating processing of the data transfer while awaiting validation of the input received in the input field of the authentication user interface screen;

in response to receipt of an acknowledgment signal from the server, via the communication subsystem, that the input received in the input field of the authentication user interface screen has been validated, proceed to display the source selection user interface screen.

11. The automated teller device of claim 1, wherein the source selection user interface screen provides a selectable element which controls whether a current status of the source accounts is displayed.

12. The automated teller device of claim 1, wherein the destination selection user interface screen provides a selectable element which controls whether a current status of the destination accounts is displayed.

13. The automated teller device of claim 1, wherein the instructions further cause the automated device to:
directly in response to selection, on the transaction acknowledgment user interface screen, of the selectable element to continue the session, display, on the display screen, a home user interface screen.

14. The automated teller device of claim 13, wherein the home user interface screen provides a plurality of selectable elements for performing an action using the automated device, wherein the selectable elements of the home user interface screen include additional selectable elements that are not present on the welcome user interface screen.

15. The automated teller device of claim 13, wherein the home user interface screen provides a selectable element to display a current status of the source account.

16. An automated teller device comprising:
a display screen;
a communication subsystem for communication with a server;
a processor coupled to the display screen and the communication subsystem; and
a memory coupled to the processor, the memory having computer-executable instructions stored thereon, the instructions, when executed by the processor, causing the automated device to, during a session:
  display, on the display screen, a welcome user interface screen providing a plurality of selectable elements for performing an action using the automated device;
  directly in response to selection of a selectable element to display more available actions, display, on the display screen, an authentication user interface screen providing an input field for receiving an authentication code associated with an access card inserted into the automated device;
  directly in response to receipt of validation of an input received in the input field of the authentication user interface screen, display, on the display screen, a home user interface screen providing a plurality of selectable elements for performing an action using the automated device, wherein the selectable elements of the home user interface screen include additional selectable elements that are not present on the welcome user interface screen;
  directly in response to selection of a selectable element to initiate a data transfer from the home user interface screen, display, on the display screen, a source selection user interface screen providing a selectable element for selecting a source account for the data transfer;
  directly in response to selection of the source account, display, on the display screen, a destination selection user interface screen providing a selectable element for selecting a destination account for the data transfer;
  directly in response to selection of the destination account, display, on the display screen, a data value selection user interface screen providing an input field for receiving a data value for the data transfer;
  directly in response to receipt of confirmation of an input received in the input field of the data value selection user interface screen, send a signal to the server, via the communication subsystem, the signal including the source account, the destination account and the data value for the data transfer;
  directly in response to receipt of an acknowledgment signal from the server including an indication that the data transfer was completed via the communication subsystem, display on the display screen, a transaction acknowledgment user interface screen indicating completion of the data transfer, the transaction acknowledgment user interface screen providing a selectable element to end the session and a selectable element to continue the session; and
  directly in response to selection of the element to end the session in the transaction acknowledgment user interface screen, display, on the display screen, a record preview user interface screen providing a preview of a record of the session and an a selectable element to generate output of the record,
wherein the welcome user interface screen, the authentication user interface screen, the home user interface screen, the source selection user interface screen, the destination selection user interface screen, the data value selection user interface screen, the a transaction acknowledgment user interface screen indicating completion of the data transfer, the transaction acknowledgment user interface screen, and the record preview user interface screen are distinct and separate user interface screens.

17. The automated teller device of claim 16, wherein the home user interface screen provides a selectable element to display a current status of the source account.

18. The automated teller device of claim 16, wherein the source selection user interface screen provides a selectable element to display a current status of the source accounts.

19. The automated teller device of claim 16, wherein the destination selection user interface screen provides a selectable element to display a current status of the destination accounts.

20. An automated teller device comprising:
a display screen;
a communication subsystem for communication with a server;
a processor coupled to the display screen and the communication subsystem; and
a memory coupled to the processor, the memory having computer-executable instructions stored thereon, the instructions, when executed by the processor, causing the automated device to, during a session:
  display, on the display screen, a welcome user interface screen providing a plurality of selectable elements for performing an action using the automated device;
  directly in response to selection of a selectable element to display more available actions, display, on the display screen, an authentication user interface screen providing an input field for receiving an authentication code associated with an access card inserted into the automated device;
  directly in response to receipt of validation of an input received in the input field of the authentication user interface screen, display, on the display screen, a home user interface screen providing a plurality of selectable elements for performing an action using the automated device, wherein the selectable elements for performing an action of the home user interface screen include additional selectable elements for performing an action that are not present on the welcome user interface screen and one or more selectable account elements;
  directly in response to selection of an account element from the home user interface screen, display, on the display screen, an account history user interface screen providing a listing of recent exchanges of data performed for the account and a plurality of selectable elements for performing an action using the automated device;

directly in response to selection of an element to initiate a data transfer from the account history user interface screen, display, on the display screen, a destination selection user interface screen providing a selectable element for selecting a destination account for the data transfer;

directly in response to selection of the destination account, display, on the display screen, a data value selection user interface screen providing an input field for receiving a data value for the data transfer;

directly in response to receipt of confirmation of an input received in the input field of the data value selection user interface screen, send a signal to the server, via the communication subsystem, the signal including the source account, the destination account and the data value for the data transfer;

directly in response to receipt of an acknowledgment signal from the server including an indication that the data transfer was completed via the communication subsystem, display, on the display screen, a transaction acknowledgment user interface screen indicating completion of the data transfer, the transaction acknowledgment user interface screen providing a selectable element to end the session and a selectable element to continue the session; and directly in response to selection of the element to end the session in the transaction acknowledgment user interface screen, display, on the display screen, a record preview user interface screen providing a preview of a record of the session and a selectable element to generate output of the record, wherein the welcome user interface screen, the authentication user interface screen, the home user interface screen, the account history user interface screen, the destination selection user interface screen, the data value selection user interface screen, the a transaction acknowledgment user interface screen indicating completion of the data transfer, the transaction acknowledgment user interface screen, and the record preview user interface screen are distinct and separate user interface screens.

* * * * *